(12) United States Patent
Chen et al.

(10) Patent No.: US 10,360,694 B2
(45) Date of Patent: Jul. 23, 2019

(54) METHODS AND DEVICES FOR IMAGE LOADING AND METHODS AND DEVICES FOR VIDEO PLAYBACK

(71) Applicant: UC MOBILE CO., LTD., Beijing (CN)

(72) Inventors: Binghui Chen, Beijing (CN); Xiaoming Li, Beijing (CN)

(73) Assignee: UC Mobile Co., Ltd., Beijing (CN)

( * ) Notice: Subject to any disclaimer, the term of this patent is extended or adjusted under 35 U.S.C. 154(b) by 142 days.

(21) Appl. No.: 15/486,531

(22) Filed: Apr. 13, 2017

(65) Prior Publication Data

US 2017/0223393 A1    Aug. 3, 2017

Related U.S. Application Data

(63) Continuation of application No. 15/033,315, filed as application No. PCT/CN2014/087708 on Sep. 28, 2014, now Pat. No. 10,121,263.

(30) Foreign Application Priority Data

Oct. 31, 2013   (CN) .......................... 2013 1 0533474
Nov. 21, 2013   (CN) .......................... 2013 1 0593763

(51) Int. Cl.
*H04N 21/4782*     (2011.01)
*H04N 21/858*      (2011.01)
(Continued)

(52) U.S. Cl.
CPC ........... *G06T 9/00* (2013.01); *H04N 21/2393* (2013.01); *H04N 21/23605* (2013.01);
(Continued)

(58) Field of Classification Search
CPC ................ G06T 9/00; H04N 21/23605; H04N 21/2393; H04N 21/42653; H04N 21/4782; H04N 21/8543; H04N 21/8586
See application file for complete search history.

(56) References Cited

U.S. PATENT DOCUMENTS 6,721,741 B1 *   4/2004   Eyal .................. G06F 17/30017
7,769,895 B1     8/2010   Williams et al.
(Continued)

FOREIGN PATENT DOCUMENTS

CN        101446954 A        6/2009
CN        101458824 A        6/2009
(Continued)

OTHER PUBLICATIONS

Final Office Action dated Mar. 16, 2018, issued in U.S. Appl. No. 15/033,315 (25 pages).
(Continued)

*Primary Examiner* — Jacinta M Crawford
(74) *Attorney, Agent, or Firm* — Sheppard Mullin Richter & Hampton LLP

(57) ABSTRACT

The present disclosure provides methods and devices for image loading. The method includes generating a request message requesting downloading compressed texture data corresponding to a basic image; sending the request message to a server; receiving compression format data sent by the server according to the request message; and sending to a GPU the texture data contained in the compression format data. The present disclosure provides methods and devices for video playback. The method includes extracting webpage source code corresponding to a webpage address entered by a user; determining in the source code a video link address containing a preset protocol header; obtaining an address editing rule and a video player corresponding to the preset protocol header; according to the address editing (Continued)

rule, editing the information and the video link address in the source code into a video playback address containing a preset protocol header; and playing a video resource corresponding to the video playback address.

14 Claims, 18 Drawing Sheets

(51) Int. Cl.
*G06T 9/00* (2006.01)
*H04N 21/478* (2011.01)
*H04N 21/236* (2011.01)
*H04N 21/239* (2011.01)
*H04N 21/426* (2011.01)
*H04N 21/8543* (2011.01)

(52) U.S. Cl.
CPC ... *H04N 21/42653* (2013.01); *H04N 21/4781* (2013.01); *H04N 21/4782* (2013.01); *H04N 21/8543* (2013.01); *H04N 21/8586* (2013.01)

(56) References Cited

U.S. PATENT DOCUMENTS

| | | | |
|---|---|---|---|
| 2003/0018799 A1* | 1/2003 | Eyal | G06F 17/30017 709/231 |
| 2004/0239679 A1 | 12/2004 | Ito et al. | |
| 2006/0092167 A1 | 5/2006 | Wetzel | |
| 2010/0070608 A1 | 3/2010 | Hosur | |
| 2010/0205241 A1* | 8/2010 | Lin | G06F 15/16 709/203 |
| 2010/0306653 A1* | 12/2010 | Wang | G11B 27/11 715/716 |
| 2010/0325176 A1 | 12/2010 | Karlsson | |
| 2012/0320067 A1 | 12/2012 | Iourcha | |
| 2013/0024545 A1 | 1/2013 | Sheppard et al. | |
| 2013/0097670 A1 | 4/2013 | Walton | |
| 2013/0305140 A1 | 11/2013 | Ruan et al. | |
| 2014/0033023 A1* | 1/2014 | Yang | G06F 17/30905 715/234 |
| 2014/0173674 A1 | 6/2014 | Wolman et al. | |
| 2016/0260228 A1 | 9/2016 | Chen et al. | |

FOREIGN PATENT DOCUMENTS

| | | |
|---|---|---|
| CN | 102420822 A | 4/2012 |
| CN | 102663134 A | 9/2012 |
| CN | 103021023 A | 4/2013 |
| CN | 103036929 A | 4/2013 |
| CN | 103327411 A | 9/2013 |
| CN | 103336816 A | 10/2013 |
| CN | 103605534 A | 2/2014 |
| CN | 103607668 A | 2/2014 |
| WO | 2015/062388 A1 | 5/2015 |

OTHER PUBLICATIONS

Notice of Allowance dated Jul. 9, 2018, issued in U.S. Appl. No. 15/033,315 (11 pages).
International Search Report and Written Opinion for Application No. PCT/CN2014/087708, dated Nov. 19, 2014, 26 pages.
First Office Action for Chinese Application No. 201310533474.8, dated Mar. 2, 2016, 13 pages (English Translation).
Second Office Action for Chinese Application No. 201310533474.8, dated Oct. 31, 2016, 20 pages (English Translation).
First Office Action for Chinese Application No. 201310593763.7, dated Apr. 5, 2016, 15 pages (English Translation).
Notice of Allowance for Chinese Application No. 201310593763.7, dated Sep. 7, 2016, 2 pages (English Translation).
Non-Final Office Action for U.S. Appl. No. 15/033,315, dated Oct. 3, 2017, 16 pages.

* cited by examiner

METHODS AND DEVICES FOR IMAGE LOADING AND METHODS AND DEVICES FOR VIDEO PLAYBACK

CROSS-REFERENCE TO RELATED APPLICATIONS

This application is continuation application of U.S. patent application Ser. No. 15/033,315, filed on Apr. 29, 2016, which is a national stage application of International Application No. PCT/CN2014/087708, filed on Sep. 28, 2014, which claims priority to and benefits of Chinese Patent Application No. 201310533474.8, filed on Oct. 31, 2013, and Chinese Patent Application No. 201310593763.7, filed on Nov. 21, 2013. The contents of the above-referenced applications are incorporated herein by reference in their entirety.

TECHNICAL FIELD

The present disclosure relates to the field of Internet technologies, and more particularly to methods and devices for image loading and methods and devices for video playback.

BACKGROUND

At present, many webpage games are developed by using a Canvas drawing tool based on HTML (i.e., HyperText Mark-up Language). In these games, a frame of a complete game screen is formed by using some basic images, such as characters, animals, background patterns and so on, and through further rendering, repetition, filling, and other drawing operations of a Canvas. In order to improve user experience of game players, a browser may use an OpenGL ES (OpenGL for Embedded Systems) technology to speed up drawing of the Canvas. OpenGL ES uploads the basic images used in the games to a GPU (i.e., Graphic Processing Unit) as textures, which are then used by the Canvas for drawing.

When the present methods use OpenGL ES for Canvas, each basic image corresponds to one url (Uniform Resource Locator). The browser finds an address where the image is stored according to the url and downloads image data. The image data may be in jpg, png, gif, webp, and other formats, and the browser needs to decode the image data to bitmap format data and uploads the bitmap format data obtained to the GPU as one texture. The GPU draws the texture onto the Canvas, and the Canvas completes a frame of a game screen by using textures of some basic images in combination with some subsequent drawing actions.

With the development of webpage games, the image resolution and number of the basic images in the webpage games become greater. When the browser decodes image data into bitmap format data, the amount of the bitmap format data obtained is greater such that, when GPU is used for speeding up Canvas drawing, a problem will arise. That is the slower speed at which the bitmap format data is uploaded to the GPU, thereby increasing the time for the GPU to upload the bitmap format data to the Canvas, which will thus reduce the Canvas drawing speed. Moreover, the memory space of the GPU is limited, and uploading of the bitmap format data to the GPU will occupy lots of the memory space of the GPU, leading to reduced operating speed of the GPU and smoothness of the game.

In addition, it is contemplated that with continuous development of wireless network and mobile terminal technologies, watching videos through mobile terminals has become many people's habits. At present, most users open an online video website through browsers of the mobile terminals, search for video resources that the users want to watch, and directly play the found video resources on the browser.

In order to prevent other websites from using their own video resources, many video websites will add a customized protocol header to a video playback address of a video resource, so as to encrypt and protect an actual video playback address of the video resource. When a browser is used to open such video websites, since the browser acquires a video playback address with a customized protocol header, the corresponding video resource cannot be found on a server of the video websites through the video playback address, such that the video resource cannot be played on the browser.

In order to allow users to watch video resources on such video websites, a video player released on such video websites needs to be installed onto the mobile terminal. The video player released on the video websites has a function of identifying the customized protocol header so that the actual video playback address can be obtained after the customized protocol header is identified. The video player may then find a corresponding video resource on the server of the video websites through the actual video playback address, and finally the find video resource to play.

Because the user cannot directly use a browser to play video resources of a video website, and it is often necessary to re-open the video player to play the video resources, the whole process of playing the video resources is very cumbersome, failing to meet the user's desire to directly watch videos or films on the browser, which affects the user's experience in watching video resources on the mobile terminal.

SUMMARY

Embodiments of the present disclosure provide methods and devices for image loading, to solve the problems described above and other technical problems where a Canvas takes up a large space in the memory of a GPU during loading of images and thus to reduce the drawing speed of the Canvas.

In order to solve the aforementioned technical problems, the embodiments of the present disclosure disclose the following technical solutions.

In a first aspect, the present disclosure provides a method for image loading, the method including: generating, by a browser, a request message requesting downloading compressed texture data corresponding to a basic image; sending, by the browser, the request message to a server; receiving, by the browser, compression format data that contains the compressed texture data corresponding to the basic image sent by the server according to the request message; and sending, by the browser, to a Graphic Processing Unit (GPU) the compressed texture data contained in the compression format data, to cause the GPU to send the compressed texture data to a Canvas for drawing.

In a second aspect, the present disclosure provides a method for image loading, the method including: receiving, by a server, a request message requesting downloading compressed texture data corresponding to a basic image sent by a browser; obtaining, by the server, compression format data that contains the compressed texture data according to the request message; and sending, by the server, to the browser the compression format data that contains the compressed texture data, to cause the browser to send the compressed texture data to a GPU, to cause the GPU to send the compressed texture data to a Canvas for drawing.

In a third aspect, the present disclosure provides a device for image loading, the device including: a generation unit that generates a request message requesting downloading compressed texture data corresponding to a basic image; a first sending unit that sends the request message generated by the generation unit to a server; a receiving unit that receives compression format data that contains the compressed texture data corresponding to the basic image sent by the server according to the request message; and a second sending unit that sends to a GPU the compressed texture data contained in the compression format data, to cause the GPU to send the compressed texture data to a Canvas for drawing.

In a fourth aspect, the present disclosure provides a device for image loading, the device including: a first receiving unit that receives a request message requesting downloading compressed texture data corresponding to a basic image sent by a browser; an obtaining unit that obtains compression format data that contains the compressed texture data according to the request message received by the first receiving unit; and a third sending unit that sends to the browser the compression format data that contains the compressed texture data obtained by the obtaining unit, to cause the browser to send the compressed texture data to a GPU, to cause the GPU to send the compressed texture data to a Canvas for drawing.

As described in the above embodiments, after a basic image is determined, a browser first sends a request message to a server, to request downloading compressed texture data corresponding to the basic image, and receives the compressed texture data of the basis image sent by the server according to the request message. The compressed texture data received by the browser is consistent with a compression format supported by a GPU, and the amount of the compressed texture data is small relative to bitmap format data of the basic image. Therefore, when the browser uploads the compressed texture data to the GPU, the speed is faster and the memory of the GPU is saved. Meanwhile, the GPU can also rapidly send the compressed texture data to a Canvas to increase the drawing speed of the Canvas.

The embodiments of the present disclosure also provide methods and devices for video playback to make the process of playing video resources on a mobile terminal simpler and/or faster, thereby improving the experience of watching video resources on the mobile terminal.

In one aspect, the embodiments of the present disclosure provide a method for video playback. The method includes the following steps of: extracting webpage source code corresponding to a webpage address entered by a user; determining in the source code a video link address containing a preset protocol header; acquiring an address editing rule and a video player corresponding to the preset protocol header; according to the address editing rule, editing the information and the video link address in the source code into a video playback address containing the preset protocol header, the video playback address being an address identifiable for the video player; and calling the video player to play a video resource corresponding to the video playback address.

In another aspect, the embodiments of the present disclosure provide a device for video playback. The device includes: a first extraction module that extracts webpage source code corresponding to a webpage address entered by a user; a determination module that determines in the source code a video link address containing a preset protocol header; a searching module that acquires an address editing rule and a video player corresponding to the preset protocol header; an editing module that, according to the address editing rule, edits the information and the video link address in the source code into a video playback address containing the preset protocol header, the video playback address being an address identifiable for the video player; and a calling module that calls the video player to play a video resource corresponding to the video playback address.

Compared with the above described methods used by many video websites, the technical solutions provided in the embodiments of the present disclosure have the following advantages and characteristics. In the solutions provided in the embodiments of the present disclosure, a video link address includes a preset protocol header, and each preset protocol header corresponds to an address editing rule and a video player. Therefore, the present disclosure acquires the video link address containing the preset protocol header from the webpage source code corresponding to a webpage address. A video playback address that can be identified by the video player can be edited through an address editing rule, and thus to the methods may directly call the video player to play a video resource corresponding to the video playback address. Therefore, according to the solutions provided in the embodiments of the present disclosure, in the case that the webpage source code corresponding to the webpage address includes a video link address containing a preset protocol header, a video player corresponding to the preset protocol header may be called to play a video resource corresponding to the video playback address, which simplifies the process of playing the video resource, thereby improving the user's experience of watching the video resource on a mobile terminal.

BRIEF DESCRIPTION OF THE DRAWINGS

To illustrate the embodiments of the present disclosure or the technical solutions according to the in the current methods more clearly, the accompanying drawings for describing the embodiments are introduced briefly in the following. Apparently, the accompanying drawings in the following description illustrate only some embodiments of the present disclosure. Persons of ordinary skill in the art can derive other embodiments and drawings according to the accompanying drawings without creative efforts.

DETAILED DESCRIPTION

To make persons skilled in the art better understand the technical solutions described in the embodiments of the present disclosure and make the above objectives, features, and advantages of the embodiments of the present disclosure more comprehensible, the technical solutions in the embodiments of the present disclosure are further described below in detail with reference to the accompanying drawings.

Figures 1, 2A:
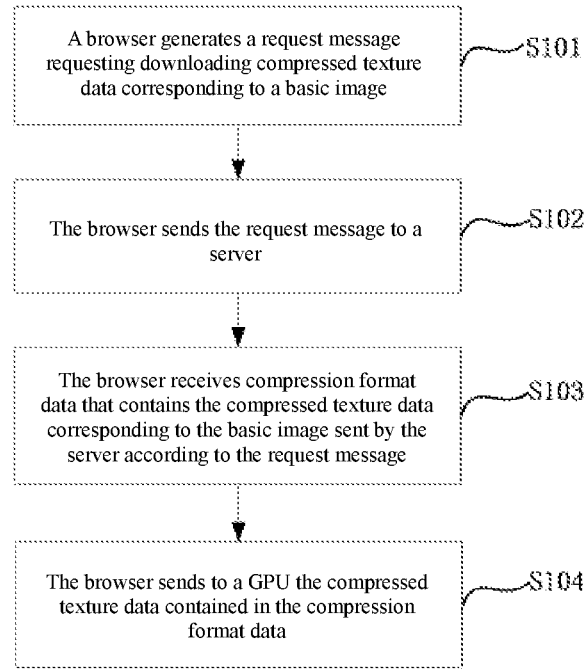
FIG. 1 is a flow chart of one embodiment of an exemplary method for image loading, according to embodiments of the present disclosure.
FIG. 2a is a schematic block diagram illustrating an exemplary compressed texture list stored by a server used by the exemplary method for image loading, according to embodiments of the present disclosure.

FIG. 1 is a flow chart of one embodiment of an exemplary method for image loading, according to embodiments of the present disclosure. The method includes the following steps:

Step S101: A browser generates a request message requesting downloading compressed texture data corresponding to a basic image.

The request message includes an identification of the basic image and a compressed texture format supported by a GPU of a current terminal. The browser may also include the model of the GPU in the request message, and the server may parse the compressed texture format or compression format supported by the GPU according to the model of the GPU.

When the browser knows an address identification of the compressed texture data corresponding to the basic image, the request message may additionally or alternatively include the address identification of the compressed texture data of the basic image.

Step S102: The browser sends the request message to a server.

Step S103: The browser receives compression format data that contains the compressed texture data corresponding to the basic image sent by the server according to the request message.

The compression format data received by the browser may be data obtained after the compressed texture data undergoes further lossless compression, e.g., data obtained after the compressed texture data undergoes GZIP and ZIP compression. Alternatively, the compression format data received by the browser is the compressed texture data.

Step S104: The browser sends to a GPU the compressed texture data contained in the compression format data, to cause the GPU to send the compressed texture data to a Canvas for drawing.

In some embodiments, the identification of the basic image may also be e.g., a url of the basic image or other suitable unique identification, and the address identification of the compressed texture data of the basic image may also be e.g., a url of the compressed texture data of the basic image or other suitable unique address identification.

It can be seen from the above embodiment that, before a Canvas draws a basic image, a browser first generates a request message requesting downloading compressed texture data corresponding to the basic image, sends the request message to a server and receives compression format data of the basic image sent by the server according to the request message. As the data amount of the compressed texture data received by the browser is smaller relative to bitmap format data of the basic image, when the browser uploads the compressed texture data to the GPU, the uploading speed is faster and the memory of the GPU is saved. Meanwhile, the GPU can also rapidly send the compressed texture data to the Canvas to increase the drawing speed of the Canvas.

Figure 2B:
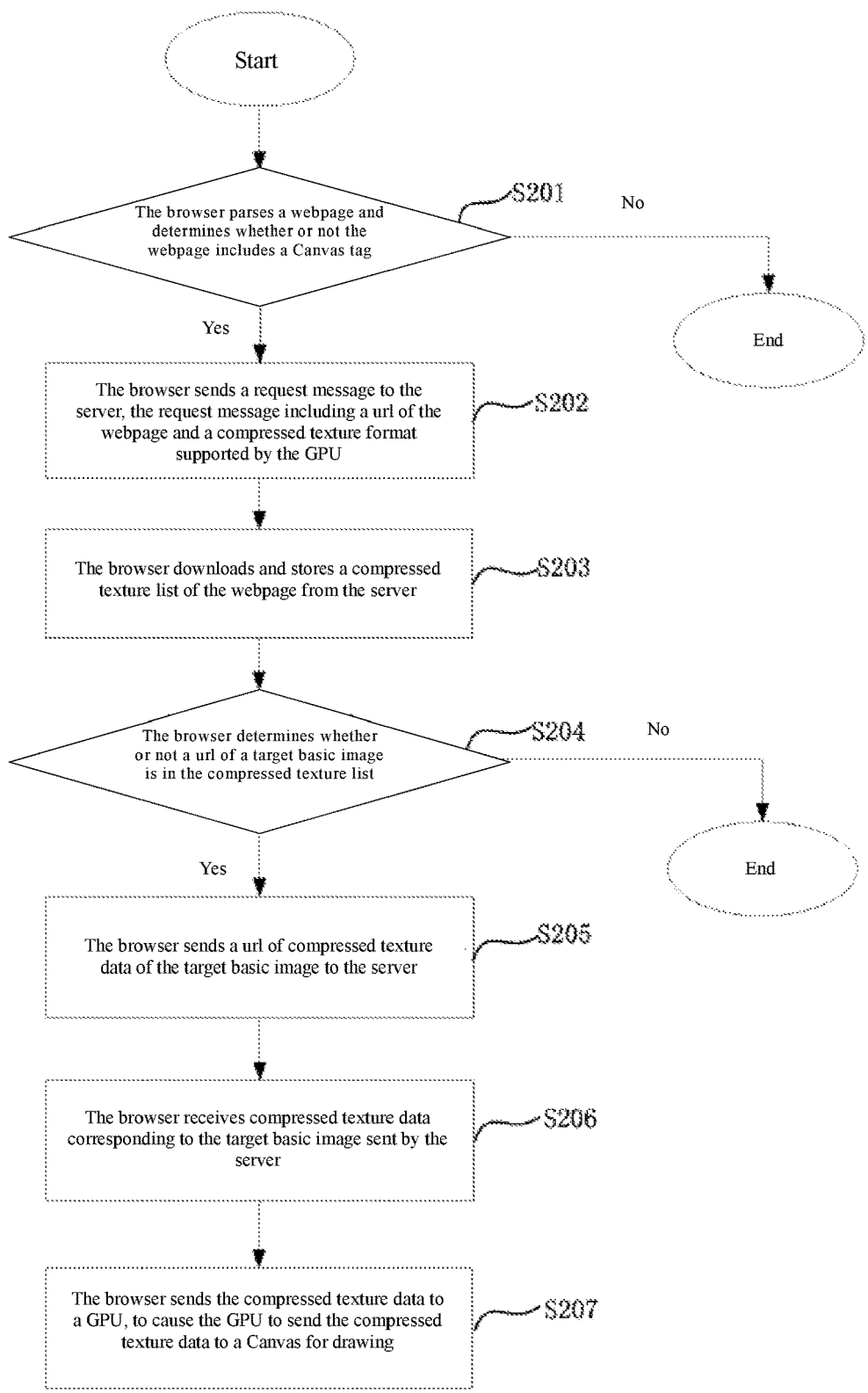
FIG. 2b is a flow chart of another embodiment of the exemplary method for image loading, according to embodiments of the present disclosure.

FIG. 2b is a flow chart of another embodiment of the method for image loading, according to embodiments of the present disclosure. The method includes the following steps:

Step S201: The browser parses a webpage and determines whether the webpage includes a Canvas tag, and if yes, step S202 is performed.

Step S202: The browser sends a request message to a server, the request message including a url of the webpage and a compressed texture format supported by the GPU.

The browser may also send the model of the GPU to the server, and the server may parse a compressed texture format supported by the GPU through the model of the GPU.

For example, when loading an image of an online game, the server may be provided by a browser manufacturer or may be provided by a game manufacturer that develops the game. A compressed texture list of the webpage is pre-stored in the server, which may be a form as shown in FIG. 2a. The compressed texture list includes a url of the webpage, a url of a basic image used on the webpage, and a url of compressed texture data of the basic image. In order to adapt to different types of terminals, the server may pre-store urls of compressed texture data corresponding to respective GPU models. The server can, according to the url of the webpage, query the compressed texture list, to obtain the url of the basic image used on the webpage and a url of compressed texture data that corresponds to the basic image and is consistent with the compression format supported by the GPU.

Step S203: The browser downloads a compressed texture list of the webpage from the server, and stores the compressed texture list.

The compressed texture list of the webpage, as shown in FIG. 2a, includes: a url of a basic image used by a Canvas on the webpage, and a url of compressed texture data that corresponds to the basic image and is consistent with the compression format supported by the GPU.

Step S204: The browser determines whether a url of a target basic image is in the compressed texture list. If yes, step S205 is performed.

After a webpage game designates a target basic image on the webpage, the browser, according to a url of the target basic image, queries the stored compressed texture list of the webpage, and determines whether the url of the target basic image is in the compressed texture list.

Step S205: The browser sends a url of compressed texture data of the target basic image to the server.

If the url of the target basic image is in the compressed texture list, the browser queries the stored compressed texture list of the webpage to obtain a url of compressed texture data of the target basic image and sends the url to the server, and the server obtains the corresponding compressed texture data according to the url of the compressed texture data.

Optionally, if the url of the target basic image is not in the compressed texture list, the browser sends to the server the url of the target basic image and a compression format supported by the GPU or a GPU model, to cause the server to download the basic image according to the url of the target basic image and the compression format supported by the GPU or the GPU model, and to convert the basic image to compressed texture data that corresponds to the target basic image and is consistent with the compression format supported by the GPU by using an image conversion tool.

Step S206: The browser receives compressed texture data corresponding to the target basic image sent by the server.

Preferably, in order to further reduce the data amount of the compressed texture data, what the browser receives may also be compression format data after the compressed texture data is further compressed, for example, the server may use a general lossless compression tool, such as GZIP or ZIP, to further compress the compressed texture data and then send the compressed texture data to the browser. Alternatively, the server may pre-store a url of the compression format data after the compressed texture data is further compressed.

Step S207: The browser sends the compressed texture data to a GPU, to cause the GPU to send the compressed texture data to a Canvas for drawing.

The browser sends the compressed texture data to a GPU as a texture, and the GPU sends the texture to a Canvas for drawing.

If, in Step S206, what the browser receives is compression format data after the compressed texture data is further compressed, the browser, after receiving the compression format data, needs to decompress the compression format data to extract the compressed texture data by using a corresponding decompression tool.

If the webpage game uses the basic image to load a game, the Canvas further uses other basic images used in the game in combination with subsequent drawing actions to complete drawing of a frame of a game screen.

In some embodiments, the url of the webpage may also be another unique identification of the webpage. Similarly, the url of the basic image may also be another unique identification of the basic image. The url of the compressed texture data of the basic image may also be another address identification of the compressed texture data of the basic image.

It can be seen from the above embodiment that the browser downloads a compressed texture list pre-stored on the server, when parsing a webpage including a Canvas tag, queries the compressed texture list, to obtain a url of compressed texture data corresponding to the basic image used on the Canvas, sends the url of the compressed texture data to the server, and receives the compressed texture data of the basic image sent by the server according to the url of the compressed texture data. As the data amount of the compressed texture data received by the browser is smaller relative to bitmap format data of the basic image, when the browser uploads the compressed texture data to the GPU, the uploading speed is faster and the memory of the GPU is saved. Meanwhile, the GPU can also rapidly send the compressed texture data to the Canvas to increase the drawing speed of the Canvas. Moreover, because no amendment is made to the webpage, the browser can automatically perform the above loading steps, which also improves flexibility and adaptability of the browser.

Figure 3:
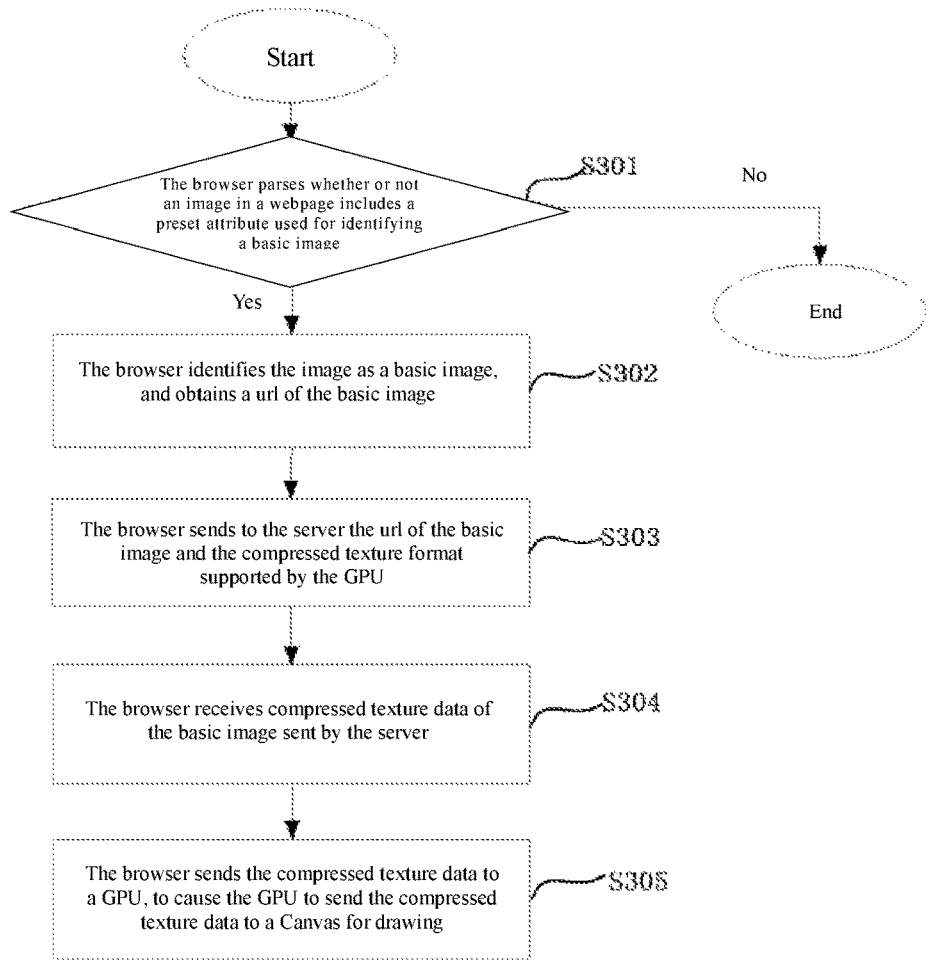
FIG. 3 is a flow chart of another embodiment of the exemplary method for image loading, according to embodiments of the present disclosure.

FIG. 3 is a flow chart of another embodiment of the method for image loading, according to embodiments of the present disclosure. The method including the following steps:

Step S301: The browser parses whether an image in a webpage includes a preset attribute used for identifying a basic image. If yes, step S302 is performed.

It is contemplated that an attribute A may be added in advance to an img element of html, and the attribute A describes that the current image is used for drawing of a Canvas. Optionally, if the server is a game server provided by a game manufacturer, it may be possible to only provide compressed texture data of certain kinds of compressed texture formats. In such instances, it is contemplated that an attribute B may be added, and the attribute is used for describing that the current image is in a format of compressed texture data provided by the game server.

Step S302: The browser identifies the image as a basic image, and obtains a url of the basic image.

The browser, by parsing the attribute A, determines whether the image is a basic image used by a Canvas.

Step S303: The browser sends to the server the url of the basic image and the compressed texture format supported by the GPU.

If the server is a game server, the browser, according to a compressed texture format indicated by the attribute B in combination with the compressed texture format supported by the GPU of the terminal, selects a commonly supported compressed texture format, and sends the commonly supported compressed texture format to the server.

Step S304: The browser receives compressed texture data of the basic image sent by the server.

The server may pre-store urls of compressed texture data of respective compression formats corresponding to respective basic images, and the server conducts a search according to the url of the basic image and the compression format supported by the GPU to acquire the compressed texture data of the basic image.

Optionally, if the server is a game server provided by a game manufacturer, the server may store compressed texture data of the basic image in several kinds of predetermined compressed texture formats.

Optionally, the server may, according to the url of the basic image sent by the browser, download the basic image, and convert the basic image to compressed texture data that corresponds to the target basic image and is consistent with the compression format supported by the GPU sent by the browser by using an image conversion tool.

Optionally, in order to further reduce the data amount of the compressed texture data, what the browser receives may also be compression format data after the compressed texture data is further compressed. For example, the server may use a general lossless compression tool, such as GZIP or ZIP, to further compress the compressed texture data and then send the compressed texture data to the browser. Alternatively, the server may pre-store a url of compression format data after the compressed texture data is further compressed.

Step S305: The browser sends the compressed texture data to a GPU, to cause the GPU to send the compressed texture data to a Canvas for drawing.

The browser sends the compressed texture data to a GPU as a texture, and then the GPU sends the texture to a Canvas for drawing. If the webpage game uses the basic image to load games, the Canvas further uses other basic images used in the game in combination with subsequent drawing actions to complete drawing of a frame of a game screen.

If, in S304, what the browser receives is compression format data after the compressed texture data is further compressed, the browser, after receiving the compression format data, needs to decompress the compression format data to extract the compressed texture data by using a corresponding decompression tool.

In some embodiments, the url of the webpage may also be another unique identification of the webpage. Similarly, the url of the basic image may also be another unique identification of the basic image. The url of the compressed texture data of the basic image may also be another address identification of the compressed texture data of the basic image.

As described in the above embodiments, the browser, by parsing a preset attribute of an image, identifies a basic image, and acquires compressed texture data of the basic image from the server. As the data amount of the compressed texture data received by the browser is small relative to bitmap format data of the basic image, when the browser uploads the compressed texture data to the GPU, the uploading speed is faster and the memory of the GPU is saved. Meanwhile, the GPU can also rapidly send the compressed texture data to a Canvas to increase the drawing speed of the Canvas. Moreover, by setting a preset attribute of an image, the browser can load a designated image, which allows for loading the designated image based on the attribute.

Figure 4:
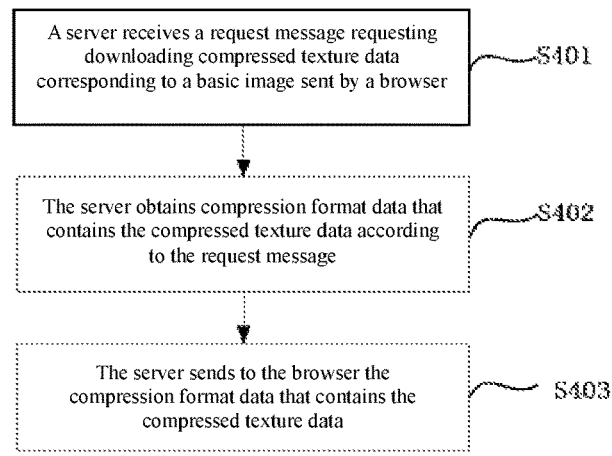
FIG. 4 is a flow chart of another embodiment of the exemplary method for image loading, according to embodiments of the present disclosure.

FIG. 4 is a flow chart of another embodiment of the method for image loading, according to embodiments of the present disclosure. The method including the following steps:

Step S401: A server receives a request message requesting downloading compressed texture data corresponding to a basic image sent by a browser.

The request message received by the server may include an address identification of compression format data corresponding to the basic image, or include an identification of the basic image and a compressed texture format supported by a GPU.

Step S402: The server obtains compression format data that contains the compressed texture data according to the request message.

The server may pre-store the address identification of the compressed texture data. When the request message includes an address identification of the compression format data, the server directly obtains the compressed texture data according to the address identification of the compression format data.

Optionally, the server may download the basic image according to the identification of the basic image contained in the request message, and convert the basic image to compressed texture data that is consistent with a compression format supported by the GPU by using an image conversion tool.

Optionally, in order to further reduce the data amount of the compressed texture data, the server may also further compress the compressed texture data. For example, the server may use a general lossless compression tool, such as GZIP or ZIP, to further compress the compressed texture data and then send the compressed texture data to the browser. Alternatively, the server may pre-store compression format data after the compressed texture data is further compressed.

Step S403: The server sends to the browser the compression format data that contains the compressed texture data, to cause the browser to send the compressed texture data to a GPU, to cause the GPU to send the compressed texture data to a Canvas for drawing.

If what the server sends is compression format data after the compressed texture data is further compressed, the browser, upon receipt, needs to use a corresponding decompression tool to decompress the compression format data to extract the compressed texture data.

In some embodiments, the identification of the basic image may also be e.g., a url of the basic image or another unique identification, and the address identification of the compressed texture data of the basic image may also be e.g., a url of the compressed texture data of the basic image or another unique address identification.

As described in the above embodiments, a browser obtains compressed texture data of a basic image according to a request message sent by the browser, and the compressed texture data is sent to the browser to cause the browser to send the compressed texture data to a GPU, and the GPU sends the compressed texture data to a Canvas for drawing. As the data amount of the compressed texture data sent by the server to the browser is small, when the browser uploads the compressed texture data to the GPU, the speed is faster and the memory of the GPU is saved. Meanwhile, the GPU can also rapidly send the compressed texture data to the Canvas to increase the drawing speed of the Canvas.

Figure 5:
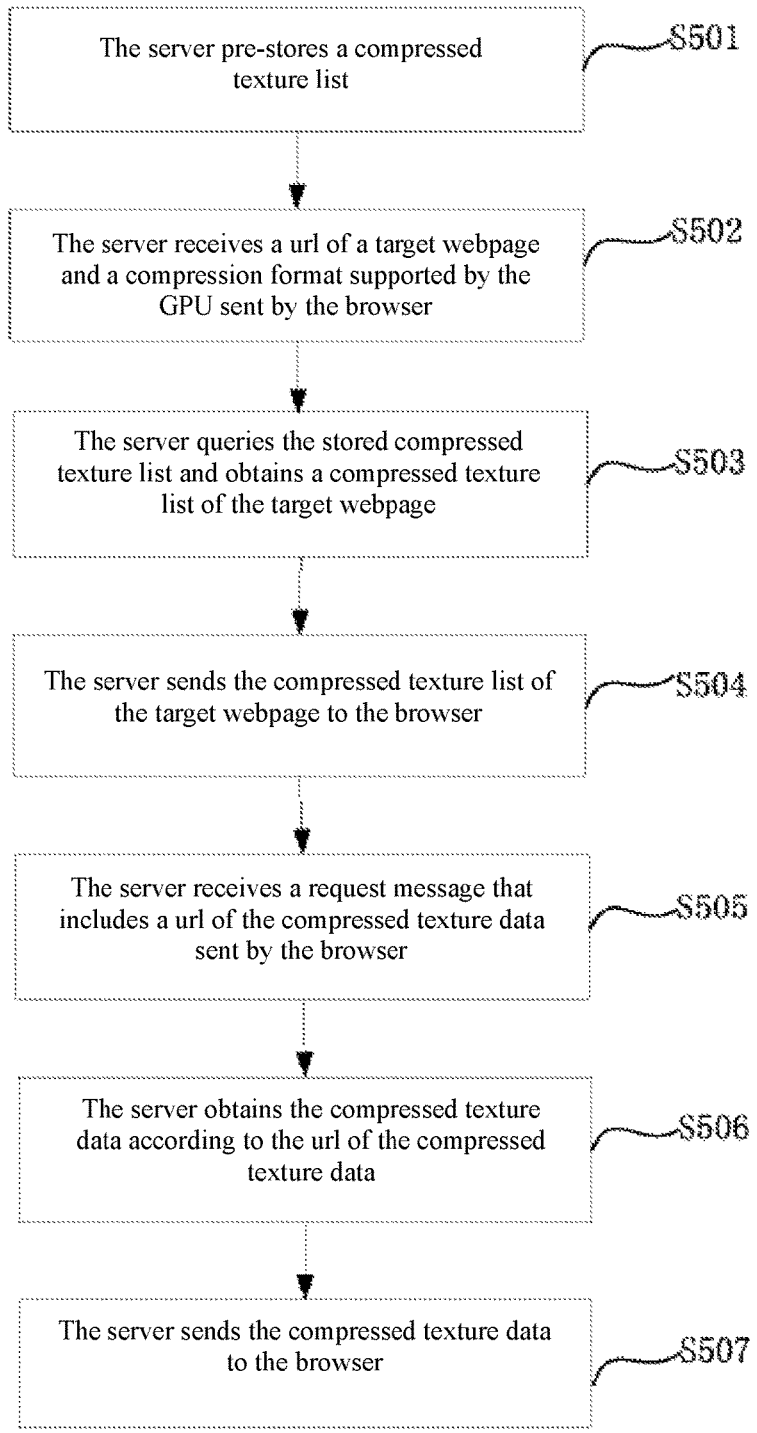
FIG. 5 is a flow chart of another embodiment of the exemplary method for image loading, according to embodiments of the present disclosure.

FIG. 5 is a flow chart of another embodiment of the method for image loading, according to embodiments of the present disclosure. The method including the following steps:

Step S501: The server pre-stores a compressed texture list.

The server may be provided by a browser manufacturer, which pre-stores compressed texture lists of a large number of known webpages. Additionally or alternatively, the server may be a game server provided by a game manufacturer and custom-made according to a certain game or several games. In such instances, the game server stores compressed texture data corresponding to basic images used in the game or games.

The server pre-stores compressed texture lists of the webpages respectively, and the compressed texture list of each webpage includes a url of the webpage, a url of a basic image used by a Canvas on the webpage, and urls of compressed texture data in various kinds of compressed texture formats corresponding to the basic image, as shown in FIG. 2a.

Step S502: The server receives a url of a target webpage and a compression format supported by the GPU sent by the browser.

Step S503: The server queries the stored compressed texture list, and obtains a compressed texture list of the target webpage.

The server, according to the url of the target webpage and the compression format supported by the GPU, queries the stored compressed texture list, and obtains a compressed texture list of the target webpage, and the obtained compressed texture list of the target webpage includes a url of a basic image used by a Canvas on the webpage and a url of compressed texture data that corresponds to the basic image and is consistent with the compression format supported by the GPU.

Step S504: The server sends the compressed texture list of the target webpage to the browser.

The server sends the queried compressed texture list of the target webpage to the browser, to cause the browser to store the compressed texture list of the webpage and to send, according to a designated target basic image, to the server a request message requesting downloading compressed texture data corresponding to the target basic image.

Step S505: The server receives a request message that includes a url of the compressed texture data sent by the browser.

Step S506: The server obtains the compressed texture data according to the url of the compressed texture data.

Step S507: The server sends the compressed texture data to the browser, to cause the browser to further send the compressed texture data to the GPU, and the GPU sends the compressed texture data to a Canvas for drawing.

In some embodiments, the server may perform further lossless compression on the compressed texture data, form corresponding compression format data, and assign a url to the compression format data. That is, in such embodiments, the url of the compressed texture data may be replaced with a url of compression format data corresponding to the compressed texture data, and after the server sends the compression format data to the browser, the browser uses a corresponding decompression tool to decompress the compression format data to extract the compressed texture data.

Preferably, when the url of the target basic image is not in the compressed texture list of the webpage stored by the browser, the server receives the url of the target basic image and a compression format supported by the GPU sent by the browser, downloads the target basic image according to the url of the target basic image, converts the target basic image to compressed texture data by using a compression tool, and finally sends the compressed texture data to the browser. The compressed texture data may also be subjected to further general lossless compression to form data in a corresponding compression format.

Optionally, in some embodiments, what the server receives may also be the model of the GPU instead of the compressed texture format supported by the GPU, because the model of the GPU can reflect the compressed texture format supported by the GPU, and the server determines the compressed texture format supported by the GPU according to the model of the GPU.

In some embodiments, how the browser determines the target basic image is not limited. For example, the browser may determine a basic image used on a Canvas by parsing a Canvas tag in the webpage, or by adding, in advance, an attribute into an img element of html, which is used for identifying the current image as a basic image for Canvas drawing. The browser may determine the target basic image by parsing the attribute.

In some embodiments, the url of the webpage may be another unique identification of the webpage. Similarly, the url of the basic image may be another unique identification of the basic image. The url of the compressed texture data of the basic image may be another address identification of the compressed texture data of the basic image.

As described in the above embodiments, the server pre-stores information of compressed texture data of a basic image used by a Canvas in a webpage and sends the compressed texture data to the browser according to a request from the browser, which further sends the compressed texture data to the GPU and then upload the compressed texture data to the Canvas for drawing. As the data amount of the compressed texture data sent by the server to the browser is small, when the browser uploads the compressed texture data to the GPU, the speed is faster and the memory of the GPU is saved. The GPU can also rapidly send the compressed texture data to the Canvas to increase the drawing speed of the Canvas.

Figure 6:
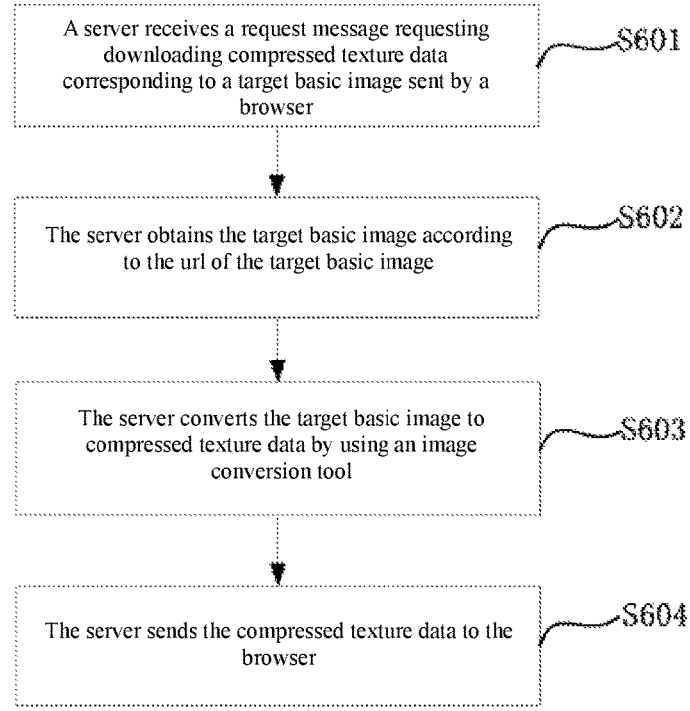
FIG. 6 is a flow chart of another embodiment of the exemplary method for image loading, according to embodiments of the present disclosure.

FIG. 6 is a flow chart of another embodiment of the method for image loading, according to embodiments of the present disclosure. The method includes the following steps:

Step S601: A server receives a request message requesting downloading compressed texture data corresponding to a target basic image sent by a browser.

The request message includes a url of the target basic image and a compressed texture format supported by a GPU.

Step S602: The server obtains the target basic image according to the url of the target basic image.

The server downloads the target basic image according to the url of the target basic image.

Step S603: The server converts the target basic image to compressed texture data by using an image conversion tool.

The server converts the target basic image to compressed texture data that is consistent with the compressed texture format supported by the GPU by using an image conversion tool and according to the compressed texture format supported by the GPU.

Preferably, in order to further reduce the data amount, the server may perform further lossless compression on the compressed texture data to obtain data in a corresponding compression format.

Step S604: The server sends the compressed texture data to the browser.

The server sends the compressed texture data or corresponding compression format data to the browser to cause the browser to upload the compressed texture data to the GPU as a texture, and then the GPU sends the texture to a Canvas for drawing.

In some embodiments, how the browser determines the target basic image is not limited. For example, the browser may determine a basic image used on a Canvas by parsing a Canvas tag in the webpage, or by adding, in advance, an attribute into an img element of html, which is used for identifying the current image as a basic image for Canvas drawing. The browser may determine the target basic image by parsing the attribute.

In some embodiments, the url of the webpage may be another unique identification of the webpage. Similarly, the url of the basic image may be another unique identification of the basic image. The url of the compressed texture data of the basic image may be another address identification of the compressed texture data of the basic image.

As described in the above embodiments, the server may, according to a request from a browser, convert a designated basic image to compressed texture data and send the compressed texture data to the browser, which may further send the compressed texture data to a GPU and then upload the compressed texture data to a Canvas for drawing. As the data amount of the compressed texture data sent by the server to the browser is small, when the browser uploads the compressed texture data to the GPU, the speed is faster and the memory of the GPU is saved. Meanwhile, the GPU may also rapidly send the compressed texture data to the Canvas, to increase the drawing speed of the Canvas. The server may compress the designated basic image according to the request from the browser without pre-storage, which saves storage of the server and allows for targeted processing.

Corresponding to the above embodiments of the image loading method, the present disclosure further provides embodiments of a device for image loading.

Figure 7:
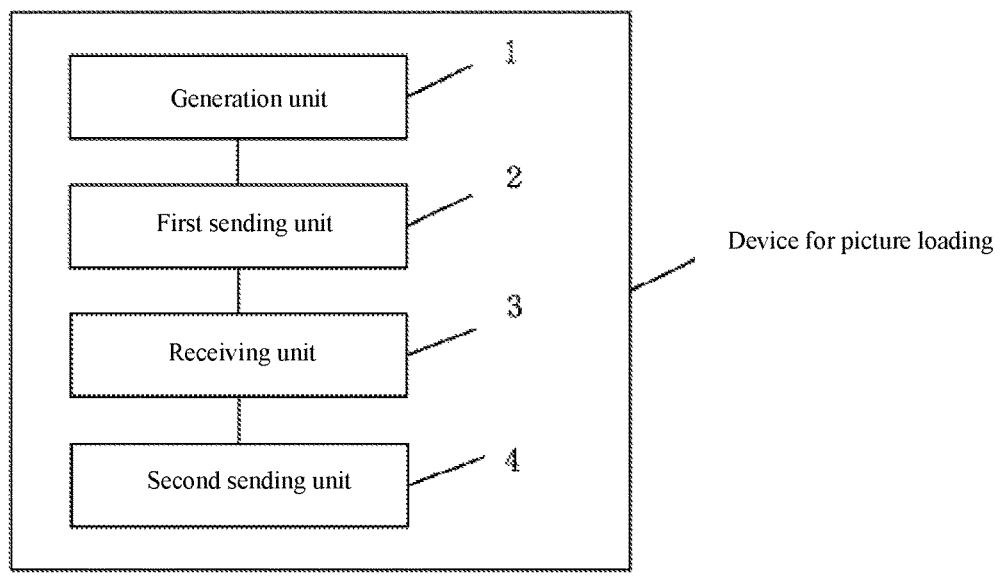
FIG. 7 is a schematic block diagram illustrating one embodiment of an exemplary device for image loading, according to embodiments of the present disclosure.

FIG. 7 is a schematic block diagram illustrating one embodiment of a device for image loading, according to embodiments of the present disclosure.

The device includes: a generation unit 1, a first sending unit 2, a receiving unit 3, and a second sending unit 4.

The generation unit 1 is used for generating a request message requesting downloading compressed texture data corresponding to a basic image.

The first sending unit 2 is used for sending the request message generated by the generation unit 1 to a server.

The receiving unit 3 is used for receiving compression format data that contains the compressed texture data corresponding to the basic image sent by the server according to the request message sent by the first sending unit 2.

The second sending unit 4 is used for sending to a GPU the compressed texture data contained in the compression format data, to cause the GPU to send the compressed texture data to a Canvas for drawing.

Figure 8:
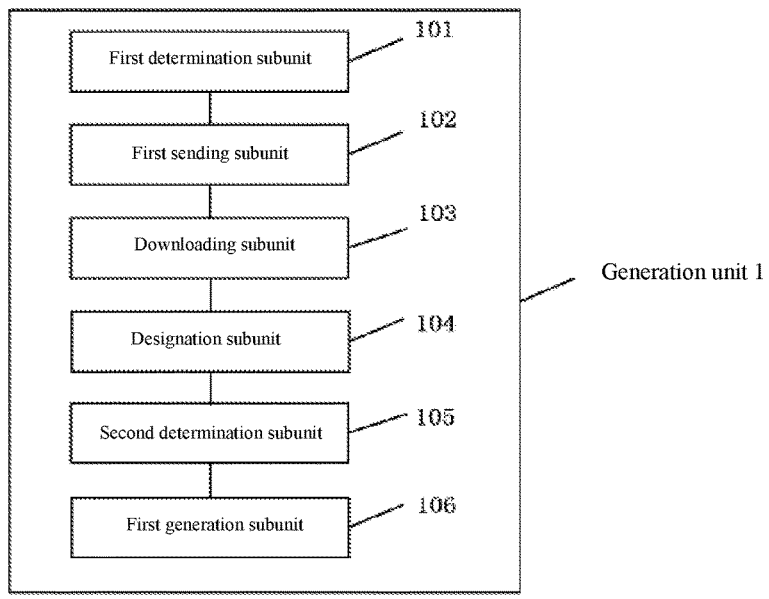
FIG. 8 is a schematic block diagram illustrating an exemplary generation unit, according to embodiments of the present disclosure.

FIG. 8 is a schematic block diagram illustrating an exemplary generation unit, according to embodiments of the present disclosure.

In the embodiments of the present disclosure, the generation unit 1 includes: a first determination sub-unit 101, a first sending sub-unit 102, a downloading sub-unit 103, a designation sub-unit 104, a second determination sub-unit 105, and a first generation sub-unit 106.

The first determination sub-unit 101 is used for determining whether a webpage includes a Canvas tag.

The first sending sub-unit 102 is used for, when the first determination sub-unit 101 determines that the webpage includes a Canvas tag, sending to the server an identification of the webpage and a compression format supported by a GPU, to cause the server, according to the identification of the webpage, to search for an identification of the basic image used on the webpage and an address identification of compressed texture data that corresponds to the basic image and is consistent with the compression format supported by the GPU. Optionally, the compression format supported by the GPU may be replaced with model information of the GPU, the identification of the webpage may be e.g., a url of the webpage, the identification of the basic image may be e.g., a url of the basic image, and/or the address identification of the compressed texture data may be e.g., an address identification of the compressed texture data.

The downloading sub-unit 103 is used for downloading a compressed texture list of the webpage from the server, and storing the compressed texture list in the webpage, the compressed texture list including: the identification of the basic image used by the Canvas on the webpage and the address identification of the compressed texture data that corresponds to the basic image and is consistent with the compression format supported by the GPU.

The designation sub-unit 104 is used for designating a target basic image.

The second determination sub-unit 105 is used for determining whether an identification of the target basic image designated by the designation sub-unit 104 is in the compressed texture list.

The first generation sub-unit 106 is used for, when the second determination sub-unit 105 determines that the identification of the target basic image is in the compressed texture list, generating a request message requesting downloading compressed texture data corresponding to the target basic image. The request message may include an address identification of compressed texture data that corresponds to the target basic image and is consistent with the compression format supported by the GPU. The request message may be used for acquiring from the server the compressed texture data of the target basic image.

Optionally, in some embodiments, the generation unit 1 may further include: a second sending sub-unit 107 (not shown) used for, when the identification of the target basic image is not in the compressed texture list, sending to the server the identification of the target basic image and the compression format supported by the GPU, to cause the server, according to the identification of the target basic image and the compression format supported by the GPU, to generate the compressed texture data that corresponds to the target basic image and is consistent with the compression format supported by the GPU by using an image conversion tool.

Figure 9:
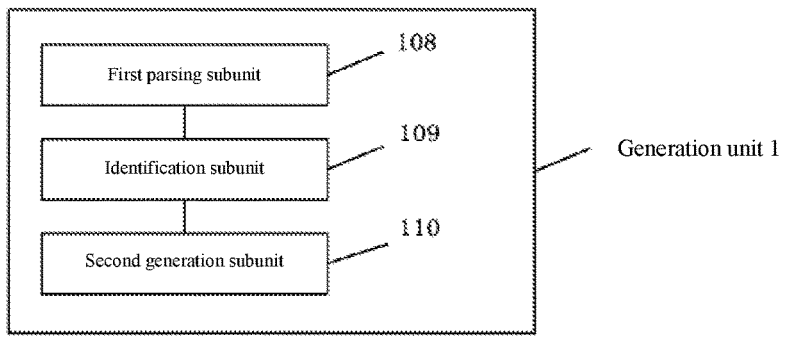
FIG. 9 is another schematic block diagram illustrating an exemplary generation unit, according to embodiments of the present disclosure.

FIG. 9 is another schematic block diagram illustrating the generation unit 1, according to embodiments of the present disclosure.

In the embodiments of the present disclosure, the generation unit 1 includes a first parsing sub-unit 108, an identification sub-unit 109, and a second generation sub-unit 110.

In some embodiments, the url of the webpage may be another unique identification of the webpage, the url of the basic image may be another unique identification of the basic image, and/or the url of the compressed texture data of the basic image may be another address identification of the compressed texture data of the basic image.

The first parsing sub-unit 108 is used for parsing whether an image in a webpage includes a first preset attribute, the first preset attribute being used for identifying the image as a basic image used by a Canvas. For example, it is contemplated that an attribute A may be added in advance to an img element of html, and the attribute A describes that the current image is used for drawing of the Canvas. It may be possible to only provide compressed texture data in certain kinds of compressed texture formats. In such instances, it is contemplated that a second preset attribute may be added, and the attribute is used for describing which kinds of formats of compressed texture data are provided.

The identification sub-unit 109 is used for, when the first parsing sub-unit 108 parses that the image in the webpage includes the first preset attribute, identifying the image as a basic image, and obtaining a url of the basic image.

The second generation sub-unit 110 is used for generating a request message requesting downloading compressed texture data corresponding to the basic image identified by the identification sub-unit 109. The request message includes the url of the basic image and the compression format supported by the GPU. The request message is used for acquiring from the server the compressed texture data of the target basic image. When the second preset attribute is included, the device may further include a second parsing sub-unit, a selection sub-unit, and a third generation sub-unit (the three sub-units are not shown in the figure). The second parsing sub-unit is used for parsing whether the image of the webpage includes a second preset attribute. The selection sub-unit is used for selecting one from the compression format supported by the GPU, the compression format corresponding to the compressed texture data provided by the server as a target compression format. The third generation sub-unit is used for generating a request message requesting downloading compressed texture data corresponding to the target basic image. The request message includes an identification of the target basic image and the target compression format, and the request message is used for acquiring the compressed texture data of the target basic image from the server.

Figure 10:
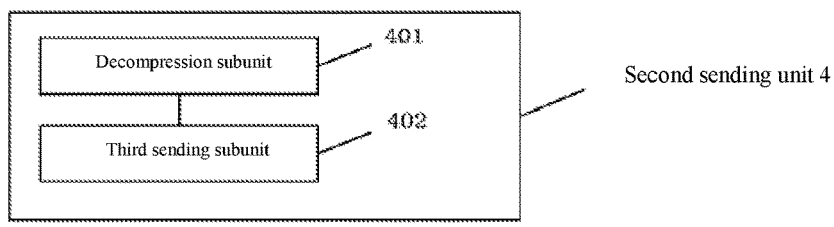
FIG. 10 is a schematic block diagram illustrating an exemplary second sending unit, according to embodiments of the present disclosure.

FIG. 10 is a schematic block diagram of a second sending unit according to embodiments of the present disclosure. The second sending unit 4 includes a decompression sub-unit 401 and a third sending sub-unit 402.

The decompression sub-unit 401 is used for decompressing the compression format data received by the receiving unit 3 by using a decompression tool, to extract compressed texture data contained in the compression format data.

The third sending sub-unit 402 is used for sending the compressed texture data extracted by the decompression sub-unit 401 to the GPU.

As described in the above embodiments, the device can acquire compressed texture data of a basic image from a server and send the compressed texture data to a GPU, which then sends the compressed texture data to a Canvas for drawing. As the data amount of the compressed texture data is small, when the browser uploads the compressed texture data to the GPU, the speed is faster and the memory of the GPU is saved. Meanwhile, the GPU can also rapidly send the compressed texture data to the Canvas to increase the drawing speed of the Canvas.

Figure 11:
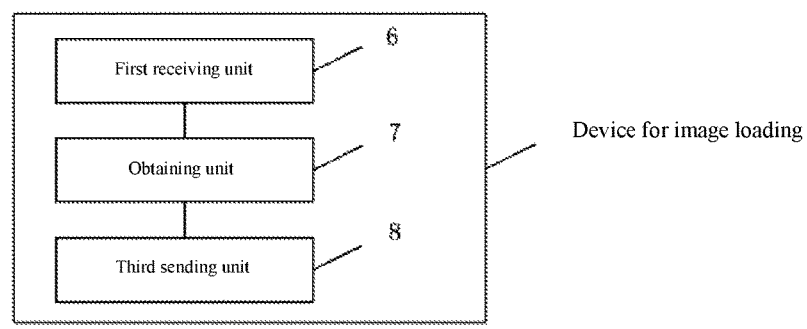
FIG. 11 is a schematic block diagram illustrating another embodiment of the exemplary device for image loading, according to embodiments of the present disclosure.

FIG. 11 is a schematic block diagram of one embodiment of the device for image loading, according to embodiments of the present disclosure.

The device includes: a first receiving unit 6, an obtaining unit 7, and a third sending unit 8.

The first receiving unit 6 is used for receiving a request message requesting downloading compressed texture data corresponding to a basic image sent by a browser.

The obtaining unit 7 is used for obtaining compression format data that contains the compressed texture data according to the request message received by the first receiving unit 6.

The third sending unit 8 is used for sending to the browser the compression format data that contains the compressed texture data obtained by the obtaining unit 7, to cause the browser to send the compression format data to a GPU as a texture, and GPU sends the texture to a Canvas for drawing.

Figure 12:
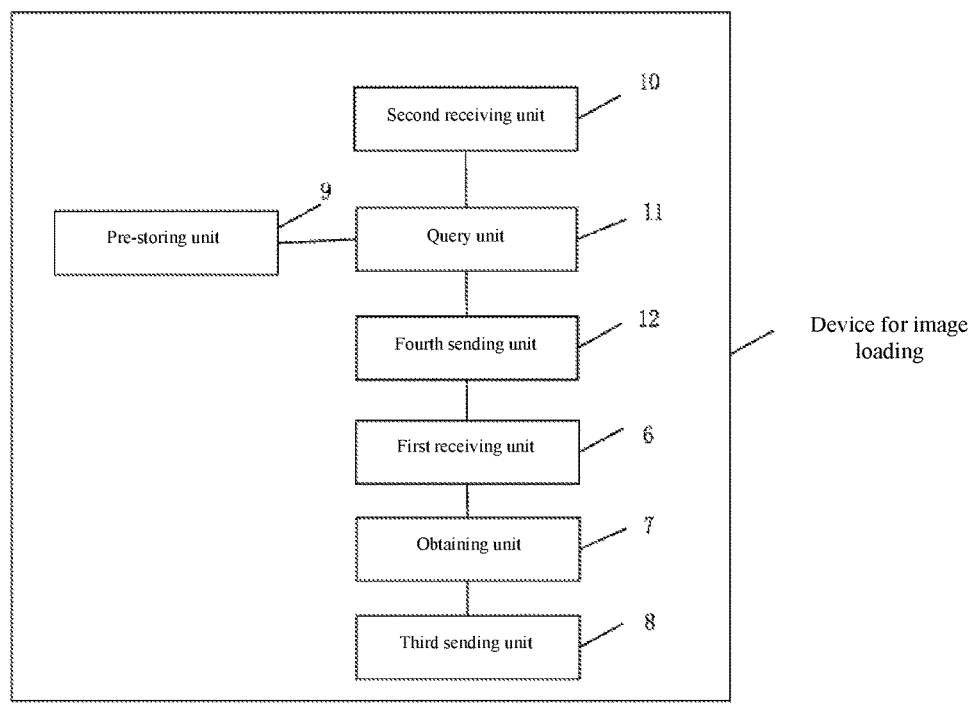
FIG. 12 is a schematic block diagram illustrating another embodiment of the exemplary image loading device, according to embodiments of the present disclosure.

FIG. 12 is a schematic block diagram of one embodiment of the device for image loading, according to embodiments of the present disclosure.

The device includes: a pre-storing unit 9, a second receiving unit 10, a query unit 11, a fourth sending unit 12, a first receiving unit 6, an obtaining unit 7, and a third sending unit 8.

In some embodiments, the url of the webpage may also be another unique identification of the webpage, the url of the basic image may be another unique identification of the basic image, and/or the url of the compressed texture data of the basic image may be another address identification of the compressed texture data of the basic image.

The pre-storing unit 9 is used for pre-storing a compressed texture list of a webpage, the compressed texture list of the webpage including a url of the webpage, a url of a basic image used by a Canvas on the webpage, and a url of the compressed texture data corresponding to the basic image.

The second receiving unit 10 is used for receiving a url of a target webpage and a compression format supported by the GPU sent by the browser.

The query unit 11 is used for querying, according to the url of the target webpage and the compression format supported by the GPU received by the second receiving unit 10, a compressed texture list of the target webpage, and obtaining a url of a basic image used by a Canvas on the target webpage and a url of compressed texture data that corresponds to the basic image and is consistent with the compression format supported by the GPU.

The fourth sending unit 12 is used for sending to the browser the url of the basic image used by the Canvas on the target webpage and the url of the compressed texture data that corresponds to the basic image and is consistent with the compression format supported by the GPU queried by the query unit 11, to cause the browser to send to the server the request message requesting downloading the compressed texture data corresponding to the basic image according to a designated target basic image.

The functions of the first receiving unit 6, the obtaining unit 7, and the third sending unit 8 are the same as those of the modules with the same reference described in the embodiment shown in FIG. 11, and are not repeated herein.

Figure 13:
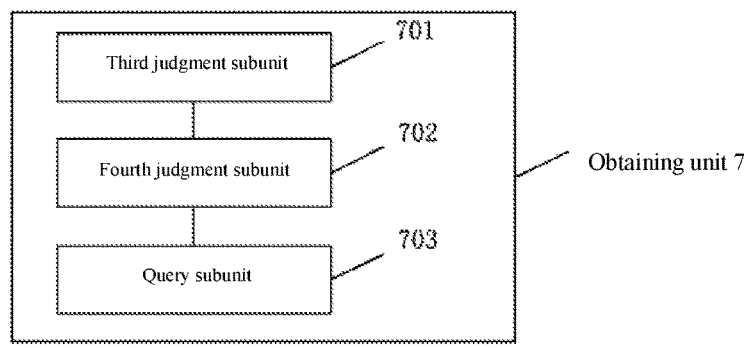
FIG. 13 is a schematic block diagram illustrating an exemplary obtaining unit, according to embodiments of the present disclosure.

FIG. 13 a schematic block diagram illustrating an embodiment of the present disclosure, in which the obtaining unit 7 includes: a third determination sub-unit 701, a fourth determination sub-unit 702, and a query sub-unit 703.

In some embodiments, the url of the webpage may be another unique identification of the webpage, the url of the basic image may be another unique identification of the basic image, and/or the url of the compressed texture data of the basic image may be another address identification of the compressed texture data of the basic image.

The third determination sub-unit 701 is used for determining whether the request message includes a url of the basic image and a compression format supported by the GPU. The fourth determination sub-unit 702 is used for, when the third determination sub-unit 701 determines that the request message includes the url of the basic image and the compression format supported by the GPU, determining whether the url of the basic image is in the compressed texture list pre-stored by the server. The query sub-unit 703 is used for, when the fourth determination sub-unit 72 determines that the url of the basic image is in the compressed texture list pre-stored by the server, querying, according to the url of the basic image and the compression format supported by the GPU, the stored compressed texture list, to obtain the compressed texture data, the compressed texture data being consistent with the compression format supported by the GPU.

Figure 14:
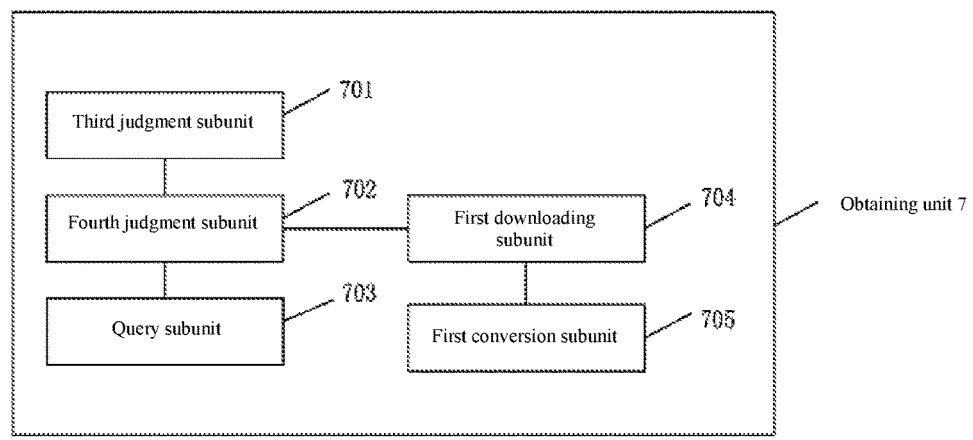
FIG. 14 is another schematic block diagram illustrating the exemplary obtaining unit, according to embodiments of the present disclosure.

FIG. 14 is another schematic block diagram illustrating an exemplary obtaining unit, in which, the obtaining unit 7 includes: a third determination sub-unit 701, a fourth determination sub-unit 702, a query sub-unit 703, a first downloading sub-unit 704, and a first conversion sub-unit 705.

In some embodiments, the url of the webpage may be another unique identification of the webpage, the url of the basic image may be another unique identification of the basic image, and/or the url of the compressed texture data of the basic image may be another address identification of the compressed texture data of the basic image.

The functions of the third determination sub-unit 701, the fourth determination sub-unit 702, and the query sub-unit 703 are also the same as those of the modules with the same reference described in the embodiment shown in FIG. 11, and are not repeated herein.

The first downloading sub-unit 704 is used for, when the fourth determination sub-unit 702 determines that the url of the basic image is not in the compressed texture list prestored by the server, downloading the basic image according to the url of the basic image contained in the request message. The first conversion sub-unit 705 is used for converting, according to the compression format supported by the GPU contained in the request message, the basic image downloaded by the downloading unit to compressed texture data that is consistent with the compression format supported by the GPU by using an image conversion tool.

Figure 15:
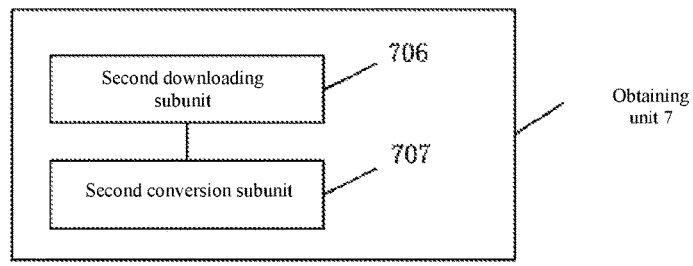
FIG. 15 is another schematic block diagram illustrating the exemplary obtaining unit, according to embodiments of the present disclosure.

FIG. 15 is another schematic block diagram illustrating an exemplary obtaining unit, in which, the obtaining unit 7 includes: a second downloading sub-unit 706 and a second conversion sub-unit 707.

In some embodiments, the url of the webpage may be another unique identification of the webpage, the url of the basic image may be another unique identification of the basic image, and/or the url of the compressed texture data of the basic image may be another address identification of the compressed texture data of the basic image.

The second downloading sub-unit 706 is used for downloading the basic image according to the url of the basic image contained in the request message received by the first receiving unit. The second conversion sub-unit 707 is used for converting, according to the compression format supported by the GPU contained in the request message received by the first receiving unit, the basic image downloaded by the downloading sub-unit to compressed texture data that is consistent with compression format supported by the GPU by using an image conversion tool.

Each functional unit provided in the embodiments of the present disclosure can run in a mobile terminal, a computer terminal, or a similar operational device, and may also be stored as a part of a storage medium.

As described in the above embodiments, the device can acquire compressed texture data of a basic image and send the compressed texture data to a browser, which is further sent by the browser to a GPU and then sent to a Canvas for drawing. As the data amount of the compressed texture data is small, when the browser uploads the compressed texture data to the GPU, the speed is faster and the memory of the GPU is saved. Meanwhile, the GPU can also rapidly send the compressed texture data to the Canvas to increase the drawing speed of the Canvas.

Embodiment of the present disclosure may provide a computer terminal, and the computer terminal may be any computer terminal device in a computer terminal group. Optionally, in some embodiments, the computer terminal may be replaced with a suitable terminal device, such as a mobile terminal.

Optionally, in some embodiments, the computer terminal may be at least one network device in a plurality of network devices in a computer network.

In such embodiments, the computer terminal may execute program code in the following steps of a method for image loading: generating, by a browser, a request message requesting downloading compressed texture data corresponding to a basic image; sending, by the browser, the request message to a server; receiving, by the browser, compression format data that contains the compressed texture data corresponding to the basic image sent by the server according to the request message; and sending, by the browser, to a GPU the compressed texture data contained in the compression format data, to cause the GPU to send the compressed texture data to a Canvas for drawing.

In such embodiments, the computer terminal may also execute program code in the following steps of a method for image loading: receiving, by a server, a request message requesting downloading compressed texture data corresponding to a basic image sent by a browser; obtaining, by the server, compression format data that contains the compressed texture data according to the request message; and sending, by the server, to the browser the compression format data that contains the compressed texture data, to cause the browser to send the compressed texture data to a GPU, to cause the GPU to send the compressed texture data to a Canvas for drawing.

Optionally, the computer terminal may include: one or more processors, a memory, and a transmission device.

The memory may be used for storing software programs and modules, for example, program instructions/modules corresponding to the method and device for image loading in the embodiments of the present disclosure. The processors, by running the software programs and modules stored in the memory, execute various functional applications and data processing, to achieve the aforementioned methods and devices for image loading. The memory may include a high-speed random memory, and/or may include a nonvolatile memory, for example, one or more magnetic storage devices, flash memories, or other nonvolatile solid-state memories. In some examples, the memory may further include memories remotely disposed relative to the processors, and these remote memories may be connected to a terminal through a network. Examples of the network include, but are not limited to, the Internet, an intranet, a local area network, a mobile communications network, or a combination thereof.

The aforementioned transmission device is used for receiving or sending data via a network. Examples of the network may include wired networks and wireless networks. For example, the transmission device includes a Network Interface Controller (NIC), which can be connected with a router through a network cable and another network device so as to conduct communication with the Internet or the local area network. For another example, the transmission device is a Radio Frequency (RF) module, which is used for conducting communication with the Internet in a wireless manner.

The memory, for example, is used for storing a preset action condition and preset user usage permission information and applications.

The processors can call the information and applications stored by the memory through the transmission device, to execute the program code in the steps of the methods in various optional or preferred embodiments of the above method embodiments.

Persons of ordinary skill in the art can understand that the computer terminal may also be a terminal device, such as a smartphone (e.g., an Android mobile phone, an iOS mobile phone or the like), a tablet computer, a handheld computer, a Mobile Internet Devices (MID), or a PAD.

Persons of ordinary skill in the art can understand that all or some of the steps in the method according to the embodiments may be implemented by a program instructing relevant hardware of the terminal device. The program may be stored in a computer-readable storage medium, and the storage medium may include: a flash disk, a Read-Only Memory (ROM), a Random Access Memory (RAM), a magnetic disk, an optical disk, and the like.

An embodiment of the present disclosure further provides a storage medium. Optionally, in this embodiment, the aforementioned storage medium may be used for storing program code executed by the method and device for image loading provided by the aforementioned embodiments.

Optionally, in this embodiment, the aforementioned storage medium may be located in any computer terminal in a computer terminal group of a computer network, or located in any mobile terminal in a mobile terminal group.

Optionally, in this embodiment, the storage medium is configured to store program codes used for performing the following steps: generating, by a browser, a request message requesting downloading compressed texture data corresponding to a basic image; sending, by the browser, the request message to a server; receiving, by the browser, compression format data that contains the compressed texture data corresponding to the basic image sent by the server according to the request message; and sending, by the browser, to a GPU the compressed texture data contained in the compression format data, to cause the GPU to send the compressed texture data to a Canvas for drawing.

Optionally, in this embodiment, the storage medium may also be configured to store program codes used for performing the following steps: receiving, by a server, a request message requesting downloading compressed texture data corresponding to a basic image sent by a browser; obtaining, by the server, compression format data that contains the compressed texture data according to the request message; and sending, by the server, to the browser the compression format data that contains the compressed texture data, to cause the browser to send the compressed texture data to a GPU, to cause the GPU to send the compressed texture data to a Canvas for drawing.

Optionally, in this embodiment, the storage medium may also be configured to store program codes used for performing the steps of the various embodiments of the methods and devices for image loading.

The present disclosure further provides methods and devices for video playback. The technical solutions in the methods and devices for video playback according to embodiments of the present disclosure are described below with reference to the accompanying drawings in the exemplary embodiments of the present disclosure. Apparently, the embodiments described herein are only exemplary embodiments rather than all the embodiments of the present disclosure. All the other embodiments derived by persons of ordinary skill in the art based on the embodiments in the present disclosure do not depart from the protection scope of the present disclosure.

Embodiment 1

Figure 16:
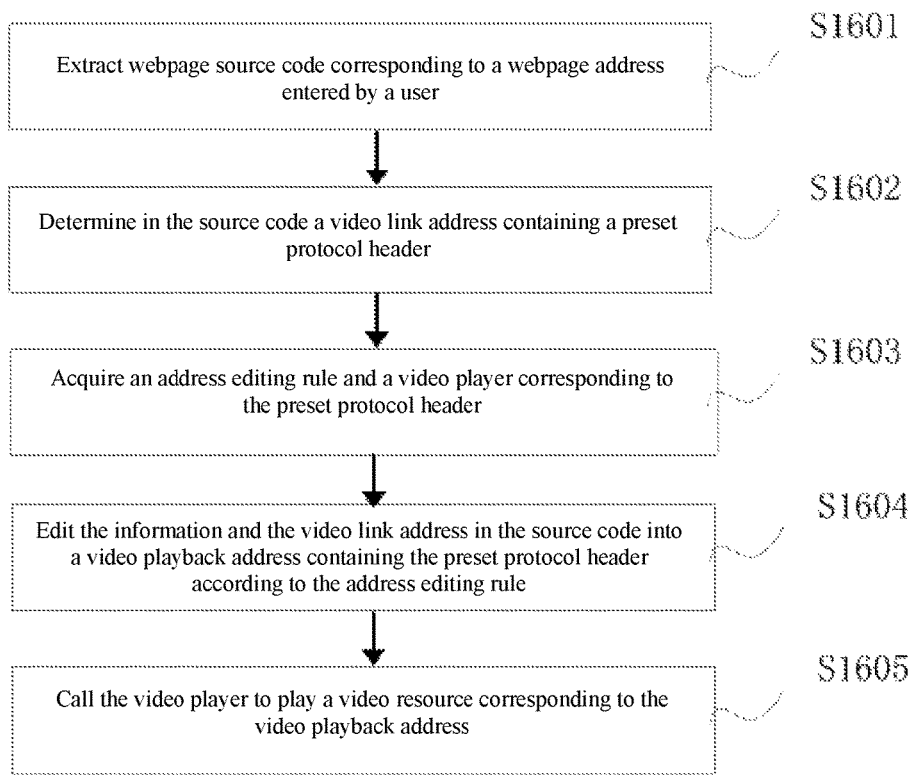
FIG. 16 is a flow chart of an exemplary method for video playback, according to an embodiment of the present disclosure.

FIG. 16 illustrates a flow chart of an exemplary method for video playback, according to an embodiment of the present disclosure. The method may simplify a process of playing video resources on a mobile terminal, which improves the experience of watching the video resources on the mobile terminal. One exemplary application of the method is that a user enters a webpage address on a browser of a mobile terminal, and after entering the webpage address in the browser, calls a video player to play a video resource corresponding to the webpage address. The method may include the following steps.

Step S1601: extracting webpage source code corresponding to a webpage address entered by a user.

The mobile terminal can acquire the webpage address entered by the user. Under normal circumstances, the user may enter a webpage address in a browser of the mobile terminal. Each webpage address corresponds to one webpage, and the webpage is edited by a webpage programming language through a source code. For example, the source code referred in this embodiment may refer to a webpage source code. After the webpage address is obtained, there are many methods of extracting webpage source code corresponding to the webpage address. For example, the webpage source code may be acquired in a manner of simulating a request header of a browser by using a webpage address. For the same webpage, if webpage source code developed for a computer includes a video link address, a webpage developed in a mobile terminal may not have a video link address. Therefore, in order to better acquire a video link address containing a preset protocol header from the source code, webpage source code played normally on a computer in a manner of simulating a request header of a computer browser may be acquired.

Step S1602: determining a video link address containing a preset protocol header in the source code.

The preset protocol header belongs to a self-defined protocol format. Many video websites, in order to prevent other websites from using their own video resources, would add a preset protocol header to a video playback address of a video resource, so as to encrypt and protect a real video playback address of the video resource. For example, both qvod:// and baiduvideoiphoneapp:// are preset protocol headers.

For example, there are many methods for determining a video link address containing a preset protocol header in the source code, and the video link address may be determined through the following steps: First, searching for a preset tag in the source code through a regular expression; and second, extracting, in the preset tag, the video link address containing the preset protocol header. The preset tag is a tag in the source code, for example, an tag of <object> or a tag of <embed type=application/xxx-plugin> or the like in the source code. The preset tag in the source code may include a video link address containing the preset protocol header. The regular expression may use a single character string to describe or match a series of character strings in accordance with a certain syntactic rule. Thus, it is the preset tag in the source code may be found by searching the source code using the regular expression.

Step S1603: Acquiring an address editing rule and a video player corresponding to the preset protocol header.

Each preset protocol header has a corresponding address editing rule and a video player. The address editing rule is a rule for editing a video link address, and according to the address editing rule, the video link address is edited into a video playback address identifiable for the corresponding video player. There are many methods of acquiring an address editing rule and a video player corresponding to the preset protocol header. For example, in a client terminal, a corresponding relationship between a preset protocol header and an address editing rule and a corresponding relationship between the preset protocol header and a video player are pre-stored, and through the two corresponding relationships, the address editing rule and the video player corresponding to the preset protocol header can be acquired. Additionally or alternatively, the aforementioned two corresponding relationships may be established or pre-stored at a server end, so that the address editing rule and the video player corresponding to the preset protocol header can be acquired at the server end. As described herein, the specific acquisition method is not limited to the above two, and other acquisition methods are within the protection scope of the embodiments of the present disclosure, which are not repeated herein.

Step S1604: editing the information and the video link address in the source code into a video playback address containing the preset protocol header according to the address editing rule, the video playback address being an address identifiable for the video player.

An address editing rule corresponding to each preset protocol header is not the same, and thus information in the source code used in the editing process also varies. For example, certain address editing rules may edit title information and a video link address in the source code into a video playback address containing the preset protocol header according to a predetermined combination manner.

As described herein, there are many ways of editing a video playback address according to an address editing rule. For example, the video playback address may be edited using the following steps: first, extracting, in the source code, a video title corresponding to the video link address; and second, editing the video title and the video link address into a video playback address according to the address editing rule. For example, a video title corresponding to the video link address in the source code is title=[http://www.372.cc] The Bourne Identity IV: The Bourne Legacy. BD1280 Super-definition with Chinese and English Captions.mkv, the video link address is baiduvideoiphoneapp://url=http://www.77vcd.com/Action/fuchunshanjutu/player-0-0.html. Then, the video title and the video link address are edited into a video playback address according to an address editing rule, and the video playback address is e.g., baiduvideoiphoneapp://?title=[http://www.372.cc] The Bourne Identity IV: The Bourne Legacy. BD1280 Super-definition with Chinese and English Captions.mkv&url=http://www.77vcd.com/Action/fuchunshanjutu/player-0-0.html.

Step S1605: calling the video player to play a video resource corresponding to the video playback address.

As the video player can identify the corresponding preset protocol header, the video player can find a video resource in the server according to the video playback address. After the video resource is found, the video player will continue to receive the video resource provided by the server, and play the video resource.

In the embodiment shown in FIG. 16, as the video link address includes a preset protocol header and each preset protocol header corresponds to an address editing rule and a video player, it is possible to acquire a video link address containing a preset protocol header from webpage source code corresponding to a webpage address, and a video playback address identifiable for the video player can be edited according to the address editing rule such that the video player can be directly called to play a video resource corresponding to the video playback address. Therefore, according to the technical solution provided in the embodiment of the present disclosure, in the case that the webpage source code corresponding to the webpage address includes a video link address of a preset protocol header, it is possible to call a video player corresponding to the preset protocol header to play a video resource corresponding to the video playback address, which simplifies the process of playing the video resource, thereby improving the users' experience of watching the video resource on a mobile terminal.

Embodiment 2

Figure 17:
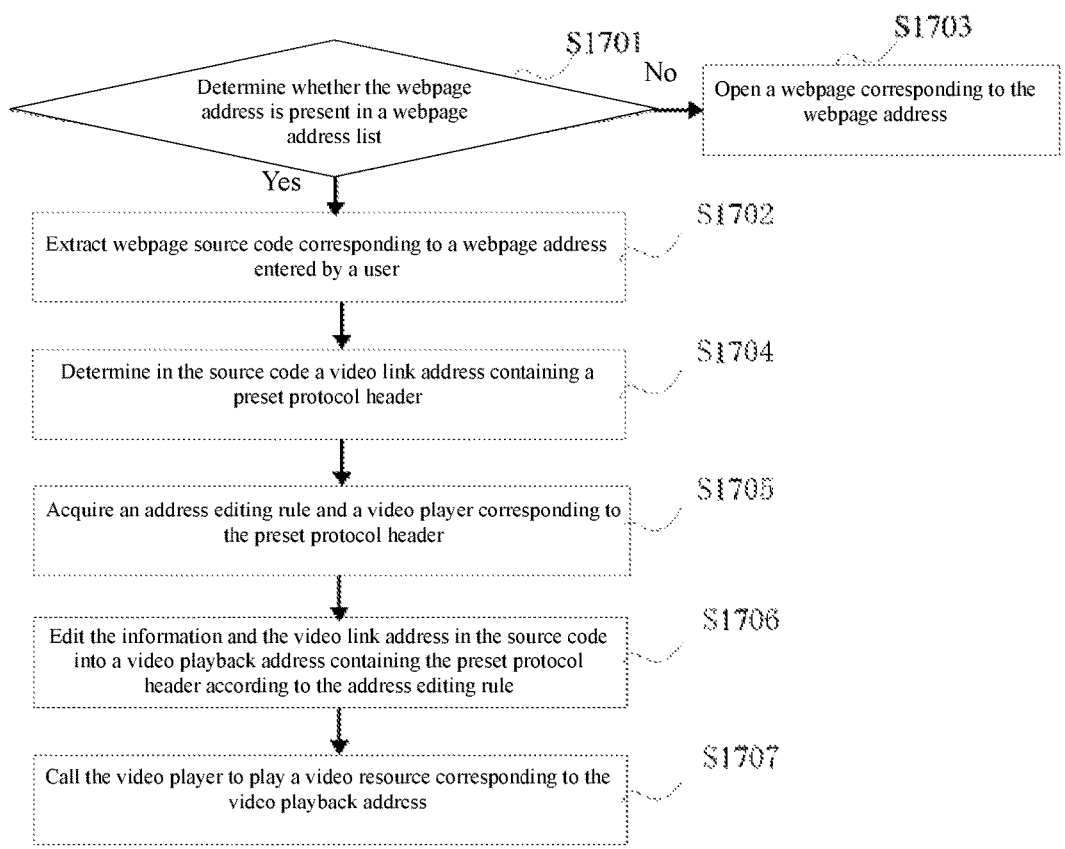
FIG. 17 is a flow chart of another exemplary method for video playback, according to an embodiment of the present disclosure.

FIG. 17 illustrates a flow chart of another exemplary method for video playback, according to embodiments of the present disclosure. According to the method, it is possible to, after a webpage address is acquired, determine whether the webpage address is present in a webpage address list, and it is possible to prevent or reduce continuously performing subsequent operations in the case that the webpage source code corresponding to the webpage address does not include a video link address, thereby saving processing resources of a mobile terminal. The method includes one or more of the following steps.

Step S1701: determining whether the webpage address is present in a webpage address list, and if yes, performing step S1702, and if not, performing step S1703.

Webpage source code corresponding to each webpage address in the webpage address list contains the video link address. If a webpage address entered by a user is present in the webpage address list, it indicates that a webpage corresponding to the webpage address entered by the user includes a video resource, and then subsequent steps may need to be performed to play the video resource, that is, step S1702 may be performed. If the webpage address entered by the user is not present in the webpage address list, it indicates that a webpage corresponding to the webpage address entered by the user does not include video resources, and thus steps may be performed to open the webpage corresponding to the webpage address, that is, step S1703 may be performed.

Step S1702: extracting webpage source code corresponding to a webpage address entered by a user.

Step S1703: opening a webpage corresponding to the webpage address.

Step S1704: determining a video link address containing a preset protocol header in the source code.

Step S1705: acquiring an address editing rule and a video player corresponding to the preset protocol header.

Step S1706: editing the information and the video link address in the source code into a video playback address containing the preset protocol header according to the address editing rule, the video playback address being an address identifiable for the video player.

Step S1707: calling the video player to play a video resource corresponding to the video playback address.

In the embodiment shown in FIG. 17, not only can the whole process of playing video resources be simplified, but the user's experience of watching video resources on a mobile terminal is also improved. Moreover, the method allows, after a webpage address is acquired, determining whether the webpage address is present in a webpage address list, to prevent or reduce continuously performing subsequent operations in the case that the webpage source code corresponding to the webpage address does not include a video link address, thereby saving processing resources of the mobile terminal.

Embodiment 3

Figure 18:
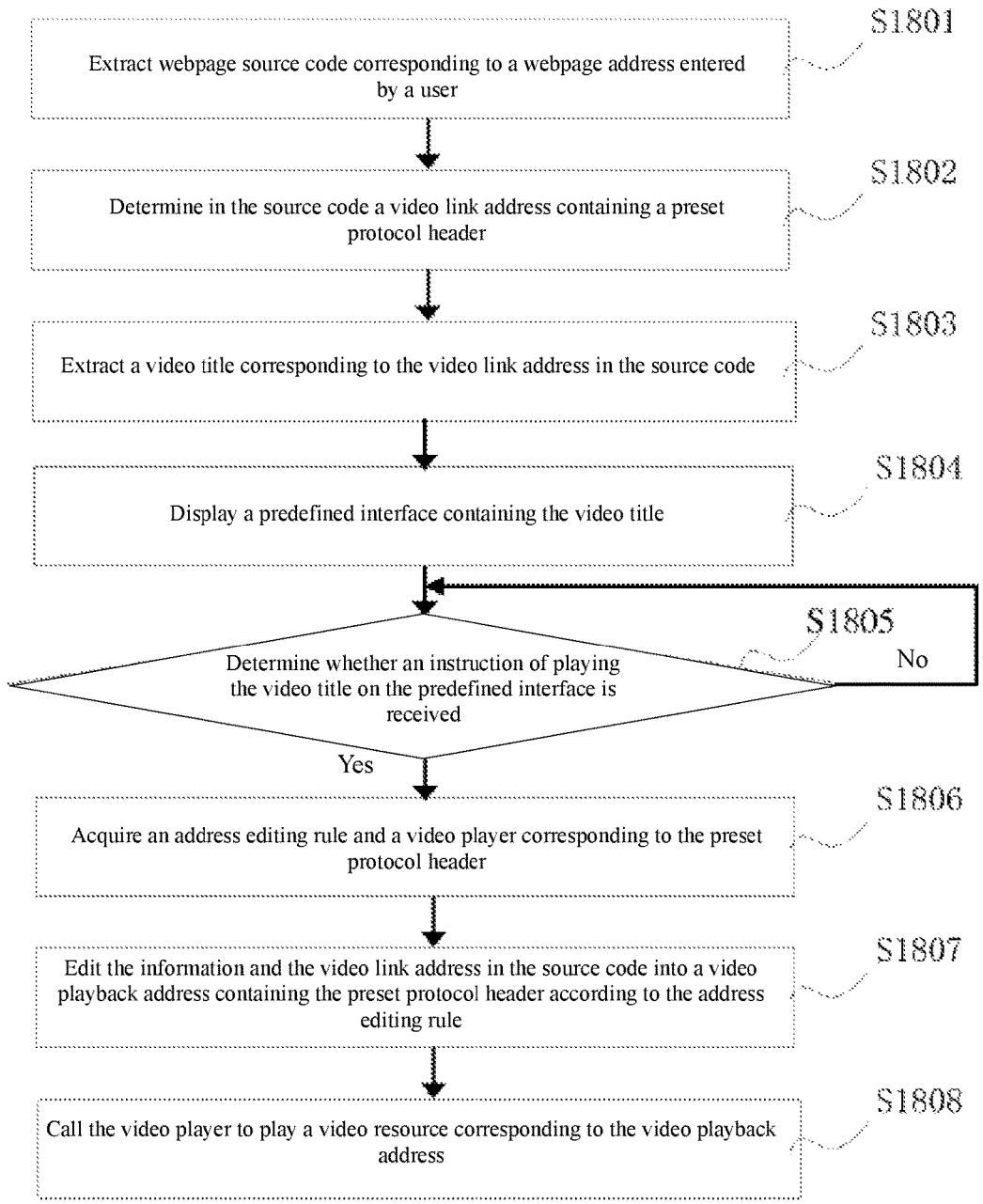
FIG. 18 is a flow chart of another exemplary method for video playback, according to an embodiment of the present disclosure.

FIG. 18 illustrates a flow chart of another exemplary method for video playback, according to embodiments of the present disclosure. The method includes extracting, in the source code, a video title corresponding to the video link address and displaying the video title in a predefined interface to wait for a user to enter an instruction of playing the video title. The method further includes, once the user enters a playback instruction, continue to a subsequent step of playing a video resource corresponding to the video title. If the instruction of playing the video title is not received, the video title stays in the predefined interface to wait for the user to enter an instruction of playing the video title. The method for video playback according to embodiments of the present disclosure can facilitate the user to select a desired video title in the predefined interface, thereby enhancing the user's experience of watching the video resource. The method includes the following steps.

Step S1801: extracting webpage source code corresponding to a webpage address entered by a user.

Step S1802: determining a video link address containing a preset protocol header in the source code.

Step S1803: extracting a video title corresponding to the video link address in the source code.

The source code further includes lots of information corresponding to the video link address, for example, video title, video ID, video type, and other types of information.

Step S1804: displaying a predefined interface containing the video title.

The video title is displayed on the predefined interface, which is mainly for facilitating the user to click on a desired video title. In order to make displayed information clearer and to facilitate the user to search for the desired video title, on the predefined interface, other video information corresponding to the video link address may be displayed on the predefined interface, such as, video title, video ID, video type, and other types of information.

Step S1805: determining whether an instruction of playing the video title on the predefined interface is received, if yes, performing step S1806, and if not, going back to step S1805.

If an instruction of playing a video title on the predefined interface is received, the subsequent step is continued. If the instruction of playing a video title on the predefined interface is not received, whether a playback instruction is received is determined continuously, that is, the method stays on the predetermined interface to wait for the instruction of playing a video title on the predefined interface.

Step S1806: acquiring an address editing rule and a video player corresponding to the preset protocol header.

Step S1807: editing the information and the video link address in the source code into a video playback address containing the preset protocol header according to the address editing rule, the video playback address being an address identifiable for the video player.

Step S1808: calling the video player to play a video resource corresponding to the video playback address.

In the embodiment shown in FIG. 18, not only can the whole process of playing video resources be simplified, but the user's experience of watching video resources on a mobile terminal is also improved. Moreover, a desired video title from a predefined interface may be selected, thereby enhancing the user's experience of watching the video resources.

Embodiment 4

Figure 19:
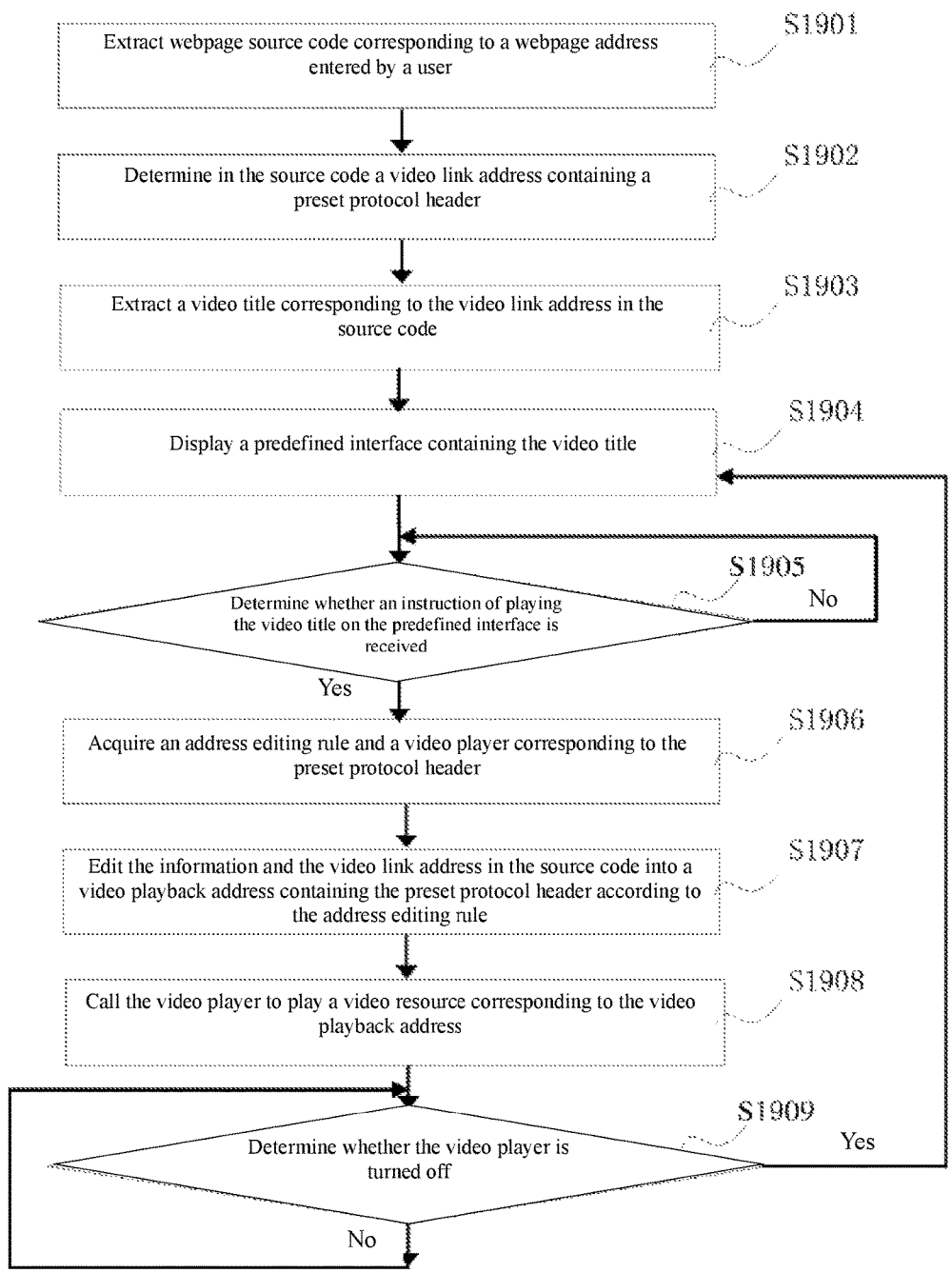
FIG. 19 is a flow chart of another exemplary method for video playback, according to an embodiment of the present disclosure.

FIG. 19 is a flow chart of another exemplary method for video playback, according to embodiments of the present disclosure. In one embodiment, after a video resource is watched by a user, the method provides a predefined interface for the user, which includes a video title, so as to facilitate the user to enter a playback instruction again on the predefined interface to watch other video resources. The method includes the following steps.

Step S1901: extracting webpage source code corresponding to a webpage address entered by a user.

Step S1902: determining a video link address containing a preset protocol header in the source code.

Step S1903: extracting a video title corresponding to the video link address in the source code.

Step S1904: displaying a predefined interface containing the video title.

Step S1905: determining whether an instruction of playing the video title on the predefined interface is received, if yes, performing step S1906, and if not, going back to step S1905.

Step S1906: acquiring an address editing rule and a video player corresponding to the preset protocol header.

Step S1907: editing the information and the video link address in the source code into a video playback address containing the preset protocol header according to the address editing rule, the video playback address being an address identifiable for the video player.

Step S1908: calling the video player to play a video resource corresponding to the video playback address.

Step S1909: determining whether the video player is turned off, if yes, going back to step S1904, and if not, going back to step S1909.

After the video player is called to play the video resource, whether the video player is turned off may be determined. If the video player is turned off, it indicates that the user does not want to continue watching the video resource played by the video player, and then a predefined interface including a video title is displayed to wait for the user to enter an instruction of playing the video title on the predefined interface again, that is, the method goes back to step S1904. If the video player is not turned off, it indicates that the user wants to watch the video resource played by the video player, and then whether the video player is turned off is determined again, that is, the method goes back to step S1909.

In the embodiment shown in FIG. 19, not only can the whole process of playing video resources be simplified, but the user's experience of watching video resources on a mobile terminal is also improved. Moreover, the method allows a user, after watching a video resource, to enter into a predefined interface that includes a video title so as to facilitate the user to enter a playback instruction again on the predefined interface to watch other video resources, thereby enhancing the user's experience of watching the video resources.

Embodiment 5

Figure 20:
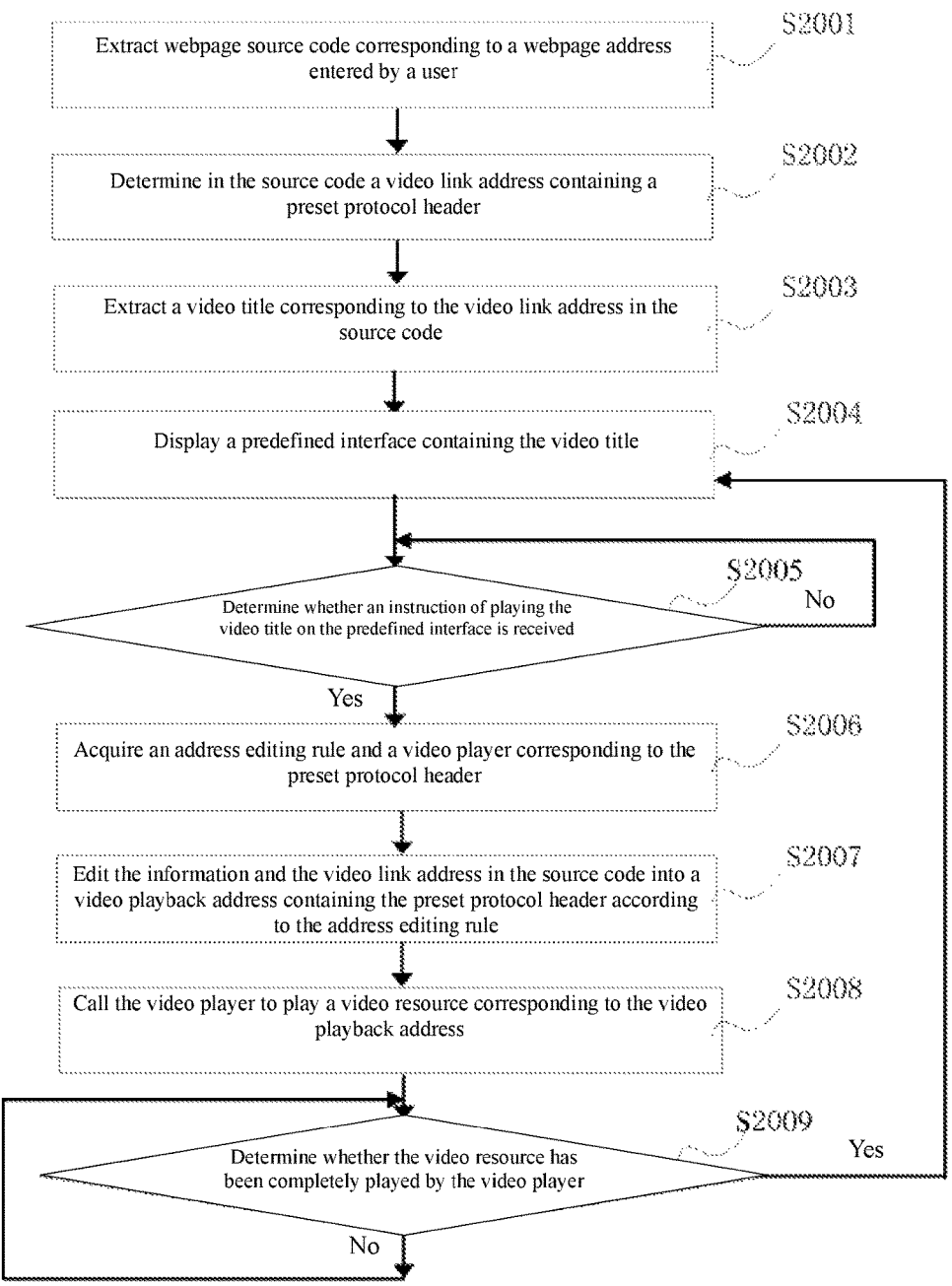
FIG. 20 is a flow chart of another exemplary method for video playback, according to an embodiment of the present disclosure.

FIG. 20 is a flow chart of another exemplary method for video playback, according to embodiments of the present disclosure. In one embodiment, after a video resource is watched, the method provides a predefined interface for the user, which includes a video title, so as to facilitate the user to enter a playback instruction again on the predefined interface to watch other video resources. The method includes the following steps.

Step S2001: extracting webpage source code corresponding to a webpage address entered by a user.

Step S2002: determining a video link address containing a preset protocol header in the source code.

Step S2003: extracting a video title corresponding to the video link address in the source code.

Step S2004: displaying a predefined interface containing the video title is displayed.

Step S2005: determining whether an instruction of playing the video title on the predefined interface is received, if yes, performing step S2006, and if not, going back to step S2005.

Step S2006: acquiring an address editing rule and a video player corresponding to the preset protocol header.

Step S2007: editing the information and the video link address in the source code into a video playback address containing the preset protocol header according to the address editing rule, the video playback address being an address identifiable for the video player.

Step S2008: calling the video player to play a video resource corresponding to the video playback address.

Step S2009: determining whether the video resource has been completely played by the video player, if yes, going back to step S2004, and if not, going back to step S2009.

After the video player is called to play the video resource, whether the video resource has been completely played by the video player may be determined. If the video resource has been completely played by the video player, it indicates that the user has watched the video resource completely, and then a predefined interface including a video title is displayed, to wait for the user to enter an instruction of playing the video title on the predefined interface again, that is, the method goes back to step S2004. If the video resource has not been completely played by the video player, it indicates that the user wants to continue to watch the video resource played by the video player, and then whether the video resource has been completely played by the video player is determined again, that is, the method goes back to step S2009.

In the embodiment shown in FIG. 20, not only can the whole process of playing video resources be simplified, but the user's experience of watching video resources on a mobile terminal is also improved. Moreover, the method also allows a user, after watching a video resource, to enter into a predefined interface that includes a video title, so as to facilitate the user to enter a playback instruction again on the predefined interface to watch other video resources, thereby enhancing the user's experience of watching the video resources.

Embodiment 6

Figure 21:
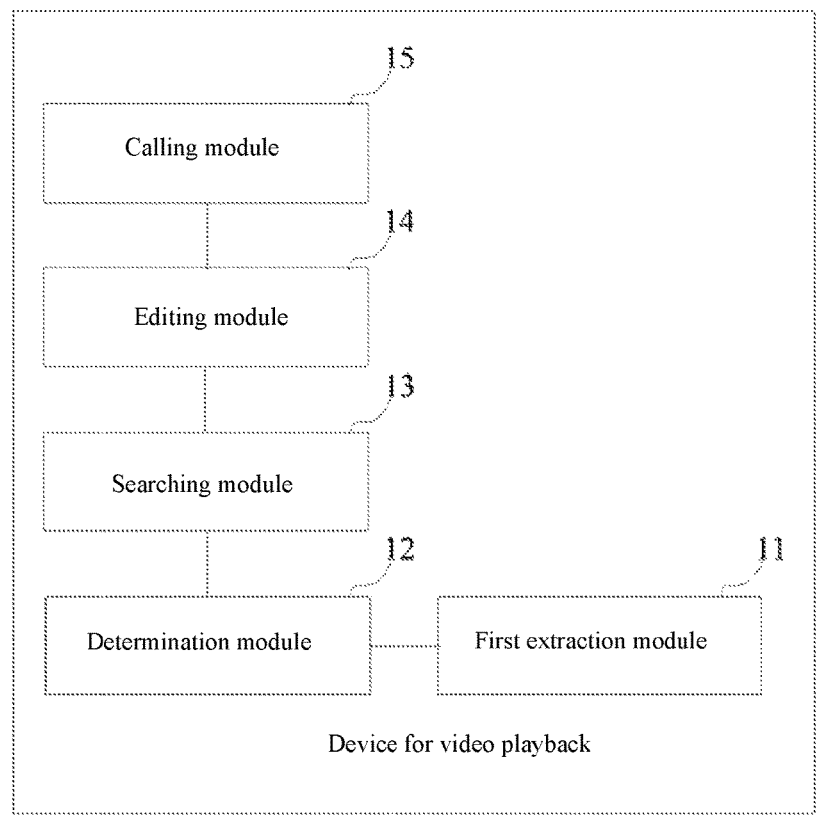
FIG. 21 is a schematic block diagram illustrating an exemplary device for video playback, according to an embodiment of the present disclosure.

FIG. 21 is a schematic block diagram illustrating an exemplary device for video playback, according to an embodiment of the present disclosure. The device may simplify a process of playing video resources on a mobile terminal, which improves the experience of watching the video resources on the mobile terminal. An exemplary application of the device is that a user enters a webpage address on a browser of a mobile terminal, and after entering the webpage address in the browser, the device may call a video player to play a video resource corresponding to the webpage address.

The device includes: a first extraction module 11 for extracting webpage source code corresponding to a webpage address entered by a user; a determination module 12 for determining in the source code a video link address containing a preset protocol header. The determination module 12 includes: a searching unit for searching for a preset tag in the source code through a regular expression, and a first extraction unit for extracting, in the preset tag, the video link address containing the preset protocol header.

The device may further include a searching module 13 for acquiring an address editing rule and a video player corresponding to the preset protocol header, and an editing module 14 for editing the information and the video link address in the source code into a video playback address containing the preset protocol header according to the address editing rule, the video playback address being an address identifiable for the video player. The editing module 14 includes: a second extraction unit for extracting, in the source code, a video title corresponding to the video link address, and an editing unit for editing the video title and the video link address into a video playback address according to the address editing rule.

The device may further include a calling module 15 used for calling the video player to play a video resource corresponding to the video playback address.

In the embodiment shown in FIG. 21, as the device provided in this embodiment corresponds to the method shown in Embodiment 1, reference can be made to the Embodiment 1 for related description about the functions the device perform in this embodiment, which is not repeated herein.

Embodiment 7

Figure 22:
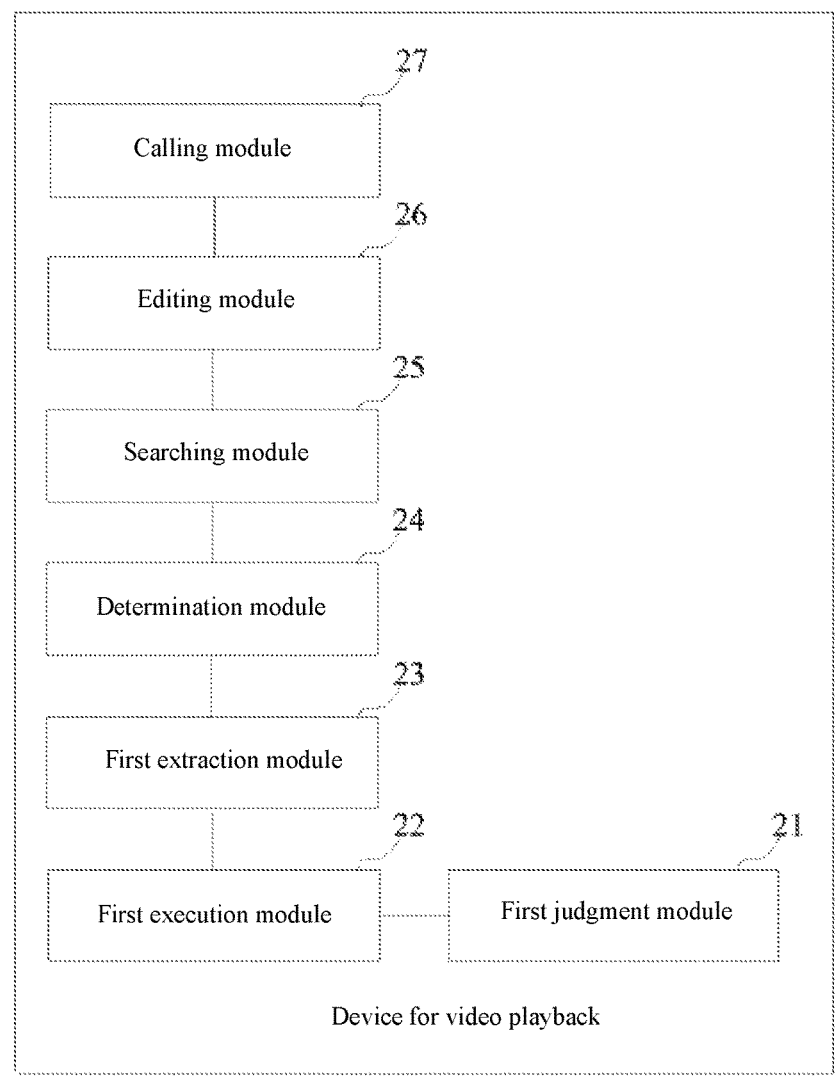
FIG. 22 is a schematic block diagram illustrating another exemplary device for video playback, according to an embodiment of the present disclosure.

FIG. 22 is a schematic block diagram illustrating another exemplary device for video playback, according to embodiments of the present disclosure. In one embodiment, after a webpage address is acquired, the device may determine whether the webpage address is present in a webpage address list, to prevent or reduce continuously performing subsequent operations in the case that the webpage source code corresponding to the webpage address does not include a video link address, thereby saving processing resources of a mobile terminal.

The device may include a first judgment module 21 for determining whether the webpage address is present in a webpage address list, wherein webpage source code corresponding to each webpage address in the webpage address list contains the video link address; and a first execution module 22 for, when the first judgment module determines that the webpage address is present in the webpage address list, executing a first extraction module 23, and when the first judgment module determines that the webpage address is not present in the webpage address list, opening a webpage corresponding to the webpage address.

The device may further include the first extraction module 23 for extracting webpage source code corresponding to a webpage address entered by a user; a confirmation module 24 for determining in the source code a video link address containing a preset protocol header; a searching module 25 for acquiring an address editing rule and a video player corresponding to the preset protocol header; an editing module 26 for, according to the address editing rule, editing the information and the video link address in the source code into a video playback address containing the preset protocol header, the video playback address being an address identifiable for the video player; and a calling module 27 for calling the video player to play a video resource corresponding to the video playback address.

In the embodiment shown in FIG. 22, as the device provided in this embodiment corresponds to the method shown in Embodiment 2, reference can be made to Embodiment 2 for the related description about the functions of the device perform in this embodiment, which is not repeated herein.

Embodiment 8

Figure 23:
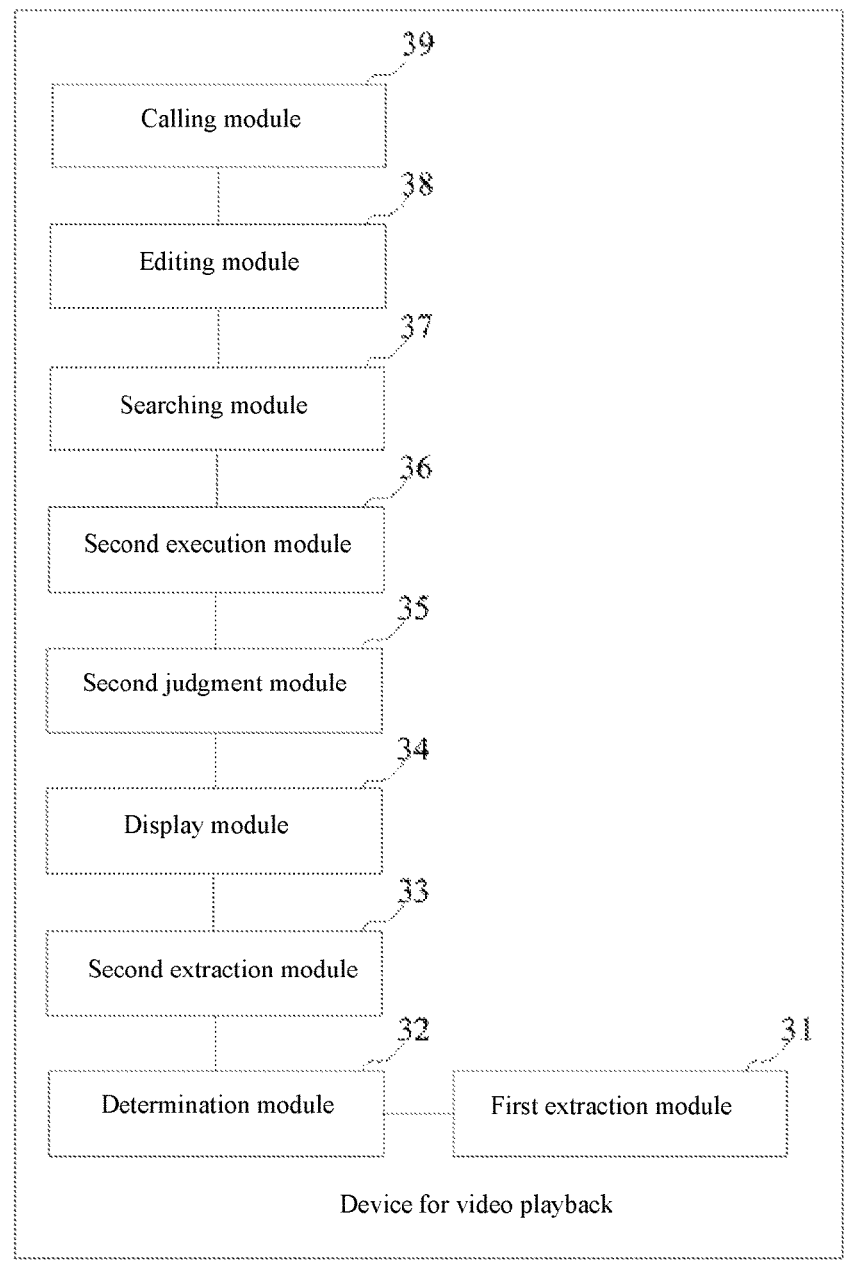
FIG. 23 is a schematic block diagram illustrating another exemplary device for video playback, according to an embodiment of the present disclosure.

FIG. 23 is a schematic block diagram illustrating another exemplary device for video playback, according to embodiments of the present disclosure. The device may extract, in the source code, a video title corresponding to the video link address and display the video title in a predefined interface, to wait for a user to enter an instruction of playing the video title. Once the user enters a playback instruction, the device may continue to a subsequent step of playing a video resource corresponding to the video title. If the instruction of playing the video title is not received, the device stays in the predefined interface, to wait for the user to enter an instruction of playing the video title. The device according to the embodiments of the present disclosure can facilitate the user to select a desired video title in the predefined interface, thereby enhancing the user's experience of watching the video resources.

The device may include a first extraction module 31 for extracting webpage source code corresponding to a webpage address entered by a user; a confirmation module 32 for determining in the source code a video link address containing a preset protocol header; a second extraction module 33 for extracting, in the source code, a video title corresponding to the video link address; a display module 34 for displaying a predefined interface containing the video title; and a second judgment module 35 for determining whether an instruction of playing the video title on the predefined interface is received.

The device may include a second execution module 36 for, when the second judgment module 35 determines that the instruction of playing the video title on the predefined interface is received, executing a searching module 37; and when the second judgment module 35 determines that the instruction of playing the video title on the predefined interface is not received, executing the second judgment module 35.

The device may include the searching module 37 for acquiring an address editing rule and a video player corresponding to the preset protocol header; an editing module 38 for, according to the address editing rule, editing the information and the video link address in the source code into a video playback address containing the preset protocol header, the video playback address being an address identifiable for the video player; and a calling module 39 for calling the video player to play a video resource corresponding to the video playback address.

In the embodiment shown in FIG. 23, as the device provided in this embodiment corresponds to the method shown in Embodiment 3, reference can be made to Embodiment 3 for the related description about the functions the device perform in this embodiment, which is not repeated herein.

Embodiment 9

Figure 24:
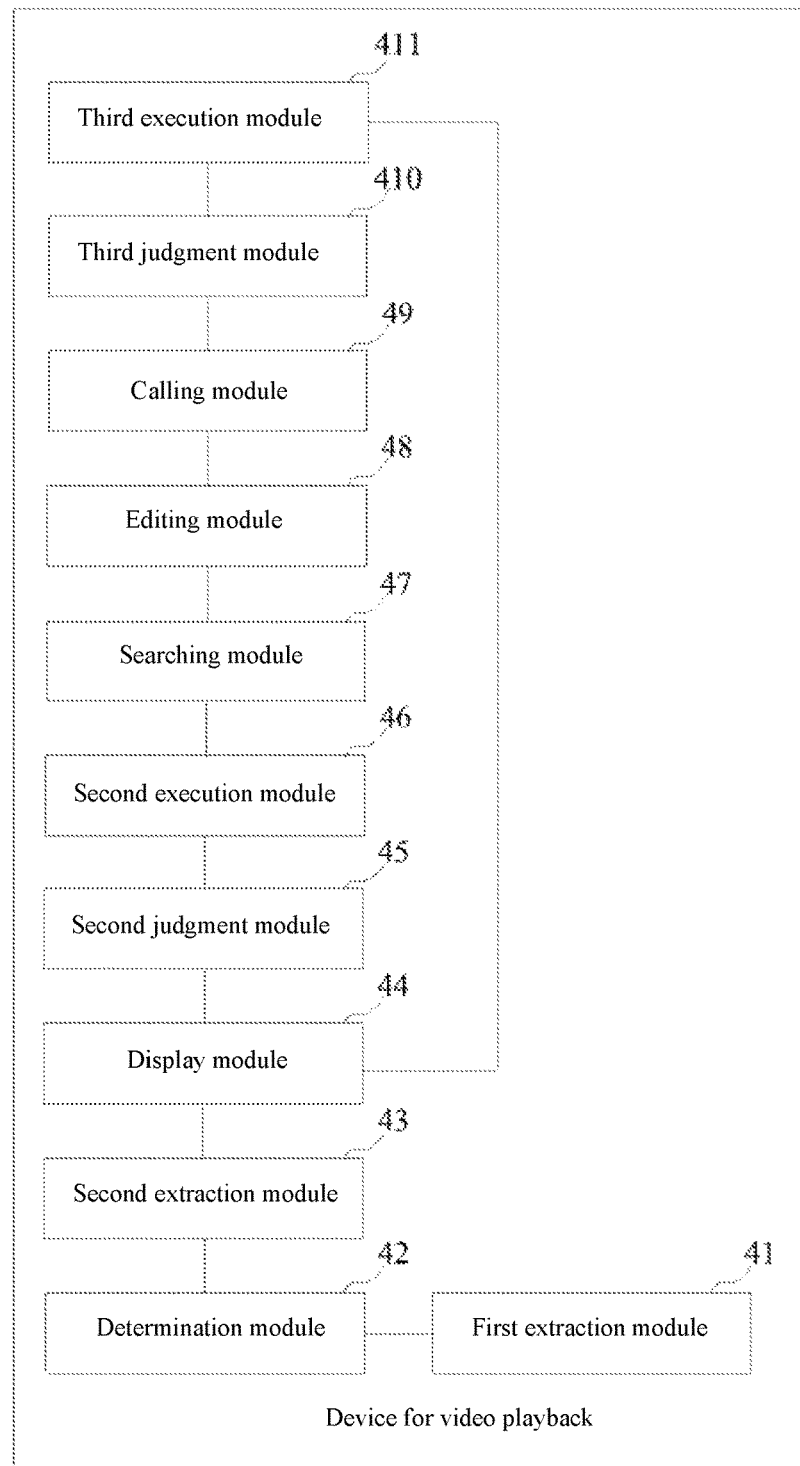
FIG. 24 is a schematic block diagram illustrating another exemplary device for video playback, according to an embodiment of the present disclosure.

FIG. 24 is a schematic block diagram illustrating another exemplary device for video playback, according to embodiments of the present disclosure. In one embodiment, after a video resource is watched, the device provides the user a predefined interface that includes a video title, so as to facilitate the user to enter a playback instruction again on the predefined interface to watch other video resources.

The device may include a first extraction module 41 for extracting webpage source code corresponding to a webpage address entered by a user; a confirmation module 42 for determining in the source code a video link address containing a preset protocol header; a second extraction module 43 for extracting, in the source code, a video title corresponding to the video link address; a display module 44 for displaying a predefined interface containing the video title; a second judgment module 45 for determining whether an instruction of playing the video title on the predefined interface is received; and a second execution module 46 for, when the second judgment module 45 determines that the instruction of playing the video title on the predefined interface is received, executing a searching module 47; and when the second judgment module 45 determines that the instruction of playing the video title on the predefined interface is not received, executing the second judgment module 45.

The device may further include the searching module 47 for acquiring an address editing rule and a video player corresponding to the preset protocol header; an editing module 48 for, according to the address editing rule, editing the information and the video link address in the source code into a video playback address containing the preset protocol header, the video playback address being an address identifiable for the video player; and a calling module 49 for calling the video player to play a video resource corresponding to the video playback address.

The device may further include a third judgment module 410 for determining whether the video player is turned off; and a third execution module 411 for, when the third judgment module 410 determines that the video player is turned off, executing the display module 44; and when the third judgment module 410 determines that the video player is not turned off, executing the third judgment module 410.

In the embodiment shown in FIG. 24, as the device provided in this embodiment corresponds to the method shown in Embodiment 4, reference can be made to Embodiment 4 for the related description about the functions the device perform in this embodiment, which is not repeated herein.

Embodiment 10

Figure 25:
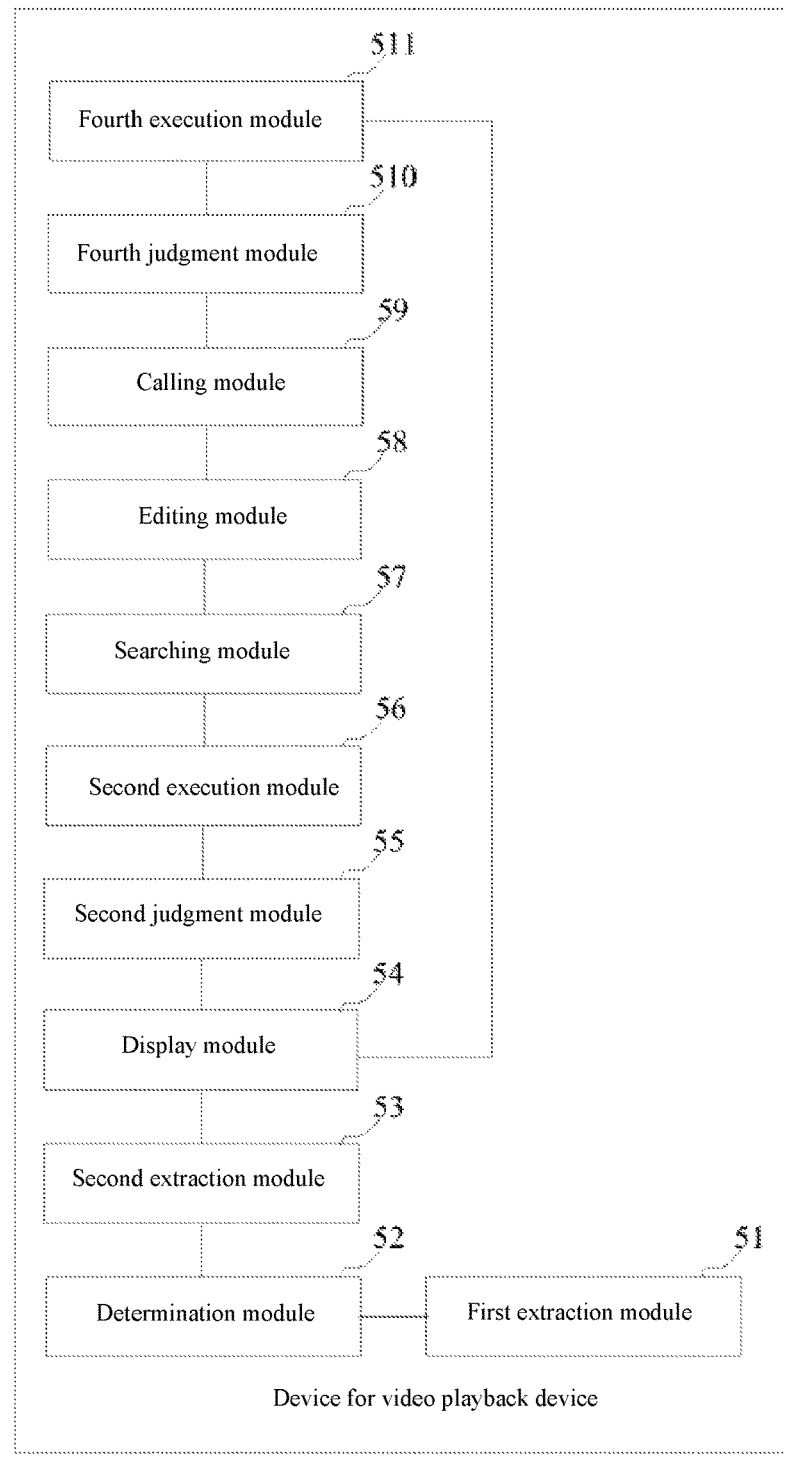
FIG. 25 is a schematic block diagram illustrating another exemplary device for video playback, according to an embodiment of the present disclosure.

FIG. 25 is a schematic block diagram illustrating another exemplary device for video playback, according to an embodiment of the present disclosure. In one embodiment, after a video resource is watched, the device provides the user a predefined interface that includes a video title, so as to facilitate the user to enter a playback instruction again on the predefined interface to watch other video resources. The device includes: a first extraction module 51 for extracting webpage source code corresponding to a webpage address entered by a user; a determination module 52 for determining in the source code a video link address containing a preset protocol header; a second extraction module 53 for extracting, in the source code, a video title corresponding to the video link address; a display module 54 for displaying a predefined interface containing the video title; a second judgment module 55 for determining whether an instruction of playing the video title on the predefined interface is received; and a second execution module 56 for, when the second judgment module 55 determines that the instruction of playing the video title on the predefined interface is received, executing a searching module 57; and when the second judgment module 55 determines that the instruction of playing the video title on the predefined interface is not received, executing the second judgment module 55.

The device may further include the searching module 57 for acquiring an address editing rule and a video player corresponding to the preset protocol header; an editing module 58 for, according to the address editing rule, editing the information and the video link address in the source code into a video playback address containing the preset protocol header, the video playback address being an address identifiable for the video player; and a calling module 59 for calling the video player to play a video resource corresponding to the video playback address.

The device may further include a fourth judgment module 510 for determining whether the video resource has been completely played by the video player; and a fourth execution module 511 for, when the fourth judgment module 510 determines that the video resource has been completely played by the video player, executing the display module 54; and when the fourth judgment module 510 determines that the video resource has not been completely played by the video player, executing the fourth judgment module 510.

Each functional module provided in the embodiment of the present application can run on a mobile terminal, a computer terminal, or a similar operational device, and may also serve as a part of a storage medium to perform storage.

In the embodiment shown in FIG. 25, as the device provided in this embodiment corresponds to the method shown in Embodiment 5, reference can be made to Embodiment 5 for the related description about the functions the device perform in this embodiment, which is not repeated herein.

Some embodiments of the present disclosure may provide a computer terminal, and the computer terminal may be any computer terminal device in a computer terminal group. In some embodiments, the computer terminal may also be replaced with a terminal device, such as a mobile terminal.

In some embodiments, the computer terminal may be located in at least one network device in a plurality of network devices in a computer network.

In such embodiments, the computer terminal may execute program codes of the following steps in a the method for video playback, including: extracting webpage source code corresponding to a webpage address entered by a user; determining in the source code a video link address containing a preset protocol header; acquiring an address editing rule and a video player corresponding to the preset protocol header; according to the address editing rule, editing the information and the video link address in the source code into a video playback address containing the preset protocol header, the video playback address being an address identifiable for the video player; and calling the video player to play a video resource corresponding to the video playback address.

Additionally or alternatively, the computer terminal may include: one or more processors, a non-transitive memory, and a transmission device.

The memory may be used for storing software programs and modules, for example, program instructions/modules corresponding to the methods and devices for video playback in accordance with the embodiments of the present disclosure. The processors, by running the software programs and modules stored in the memory, may execute various functions and data processing, to achieve the aforementioned methods and devices for video playback. The memory may include a high-speed random memory, and may also include a nonvolatile memory, for example, one or more magnetic storage devices, flash memories or other nonvolatile solid-state memories. In some examples, the memory may further include memories remotely disposed relative to the processors, and these remote memories may be connected to a terminal through a network. Examples of the network include, but are not limited to, the Internet, an intranet, a local area network, a mobile communications network, or a combination thereof.

The aforementioned transmission device is used for receiving or sending data via a network. Examples of the network may include wired networks and wireless networks. For example, the transmission device includes a Network Interface Controller (NIC), which can be connected with a router through a network cable and another network device so as to conduct communication with the Internet or the local area network. For another example, the transmission device is a Radio Frequency (RF) module, which may conduct communication with the Internet in a wireless manner.

In some embodiments, the memory stores a preset action condition and preset permission user information and applications.

The processors can call the information and applications stored by the memory through the transmission device, to execute the program codes in the steps of the methods in various optional or preferred embodiments of the above embodiments of the methods.

Persons of ordinary skill in the art can understand that the computer terminal may also be a terminal device, such as a smartphone (e.g., an Android mobile phone, an iOS mobile phone or the like), a tablet computer, a handheld computer, a Mobile Internet Devices (MID), or a PAD.

Persons of ordinary skill in the art can understand that all or some of the steps in the method according to the embodiments may be implemented by a program instructing relevant hardware of the terminal device; the program may be stored in a computer-readable storage medium, and the storage medium may include: a flash disk, a Read-Only Memory (ROM), a Random Access Memory (RAM), a magnetic disk, an optical disk, and the like.

An embodiment of the present disclosure further provides a storage medium. Optionally, in this embodiment, the aforementioned storage medium may store program codes executed by the methods and devices for video playback provided by the aforementioned embodiments.

Optionally, in this embodiment, the aforementioned storage medium may be located in any computer terminal in a computer terminal group in a computer network, or located in any mobile terminal in a mobile terminal group.

Optionally, in this embodiment, the storage medium is configured to store program codes used for performing the following steps: extracting webpage source code corresponding to a webpage address entered by a user; determining in the source code a video link address containing a preset protocol header; acquiring an address editing rule and a video player corresponding to the preset protocol header; according to the address editing rule, editing the information and the video link address in the source code into a video playback address containing the preset protocol header, the video playback address being an address identifiable for the video player; and calling the video player to play a video resource corresponding to the video playback address.

Optionally, in this embodiment, the storage medium may also be configured to store program codes used for performing the steps of the various preferred or optional methods provided by the methods and devices for video playback.

It should be noted that the embodiments shown in FIG. 1 to FIG. 25 are merely exemplary embodiments introduced in the present disclosure, and persons skilled in the art, based on the embodiments described herein, can derive more embodiments, which are thus not repeated herein.

Persons of ordinary skill in the art can realize that the units and algorithm steps of respective examples described in combination with the embodiments disclosed herein can be implemented through electronic hardware or a combination of computer software and electronic hardware. Whether the functions are executed through hardware or software depends on specific applications and design constraints of the technical solutions. Professionals can achieve the described functions by using different methods for each specific application, but such implementation should not be construed as going beyond the scope of the present disclosure.

The above are merely specific implementation modes of the present disclosure, but the protection scope of the present disclosure is not limited thereto. Any person skilled in the art can easily think of variations or replacements within the technical scope disclosed in the present disclosure, which should be covered within the protection scope of the present disclosure. Therefore, the protection scope of the present disclosure should be indicated by the following claims.

What is claimed is:

1. A method for video playback, the method comprising:
    extracting webpage source code corresponding to a webpage address entered by a user;
    determining in the source code a video link address containing a preset protocol header;
    acquiring an address editing rule and a video player corresponding to the preset protocol header;
    according to the address editing rule, editing the video link address and other information in the source code into a video playback address containing the preset protocol header, the video playback address being an address identifiable for the video player; and
    calling the video player to play a video resource corresponding to the video playback address.

2. The method according to claim 1, wherein, before the step of extracting webpage source code corresponding to a webpage address entered by a user, the method further comprises steps of:
    determining whether the webpage address is present in a webpage address list, wherein webpage source code corresponding to each webpage address in the webpage address list contains the video link address; and
    if yes, executing the step of extracting webpage source code corresponding to a webpage address entered by a user; and if not, opening a page corresponding to the webpage address.

3. The method according to claim 1, wherein the determining in the source code a video link address containing a preset protocol header comprises:
    searching for a preset tag in the source code through a regular expression; and
    extracting, in the preset tag, the video link address containing the preset protocol header.

4. The method according to claim 1, wherein the step of, according to the address editing rule, editing the video link address and other information in the source code into a video playback address containing the preset protocol header comprises:
    extracting, in the source code, a video title corresponding to the video link address; and
    editing the video title and the video link address into a video playback address according to the address editing rule.

5. The method according to claim 1, wherein, after the step of determining in the source code a video link address containing the preset protocol header and before the step of acquiring an address editing rule and a video player corresponding to the preset protocol header, the method further comprises steps of:
    extracting, in the source code, a video title corresponding to the video link address;
    displaying a predefined interface containing the video title; and
    determining whether an instruction of playing the video title on the predefined interface is received, if yes, performing the step of acquiring an address editing rule and a video player corresponding to the preset protocol header; and if not, returning to the step of determining whether an instruction of playing the video title is received.

6. The method according to claim 5, wherein, after the step of calling the video player to play a video resource corresponding to the video playback address, the method further comprises:
    determining whether the video player is turned off, if yes, returning to the step of displaying the predefined interface containing the video title; and if not, returning to the step of determining whether the video player is turned off.

7. The method according to claim 5, wherein, after the step of calling the video player to play a video resource corresponding to the video playback address, the method further comprises:
    determining whether the video resource has been completely played by the video player, if yes, returning to the step of displaying the predefined interface containing the video title; and if not, returning to the step of determining whether the video resource has been completely played by the video player.

8. A device for video playback, the device comprising a non-transitory computer readable medium having executable instructions stored thereon, that when executed by a processor, performs operations of:
    extracting webpage source code corresponding to a webpage address entered by a user;
    determining in the source code a video link address containing a preset protocol header;
    acquiring an address editing rule and a video player corresponding to the preset protocol header;
    editing the video link address and other information in the source code into a video playback address containing the preset protocol header, the video playback address being an address identifiable for the video player; and
    calling the video player to play a video resource corresponding to the video playback address.

9. The device according to claim 8, wherein the instructions, when executed by the processor, further perform operations of:
    determining whether the webpage address is present in a webpage address list, wherein webpage source code corresponding to each webpage address in the webpage address list contains the video link address; and
    if it is determined that the webpage address is present in the webpage address list, executing the step of extracting webpage source code corresponding to a webpage address entered by a user; and if it is determined that the webpage address is not present in the webpage address list, opening a webpage corresponding to the webpage address.

10. The device according to claim 8, wherein the instructions, when executed by the processor, further perform operations of:
    searching for a preset tag in the source code through a regular expression; and
    extracting, in the preset tag, the video link address containing the preset protocol header.

11. The device according to claim 8, wherein the instructions, when executed by the processor, further perform operations of:
    extracting, in the source code, a video title corresponding to the video link address; and
    editing the video title and the video link address into a video playback address according to the address editing rule.

12. The device according to claim 8, wherein the instructions, when executed by the processor, further perform operations of:
    extracting, in the source code, a video title corresponding to the video link address;
    displaying a predefined interface containing the video title; and determining whether an instruction of playing the video title on the predefined interface is received; and when it is determined that the instruction of playing the video title on the predefined interface is received, performing the step of acquiring an address editing rule and a video player corresponding to the preset protocol header; and when it is determined that the instruction of playing the video title is not received, returning to the step of determining whether an instruction of playing the video title is received.

13. The device according to claim 12, wherein the instructions, when executed by the processor, further perform operations of:

determining whether the video player is turned off; and when it is determined that the video player is turned off, returning to the step of displaying the predefined interface containing the video title; and when it is determined that the video player is not turned off, returning to the step of determining whether the video player is turned off.

14. The device according to claim 12, wherein the instructions, when executed by the processor, further perform operations of:

determining whether the video resource has been completely played by the video player; and when it is determined that the video resource has been completely played by the video player, returning to the step of displaying the predefined interface containing the video title; and when it is determined that the video resource has not been completely played by the video player, returning to the step of determining whether the video resource has been completely played by the video player.

* * * * *